United States Patent [19]

Okita et al.

[11] Patent Number: 4,527,208

[45] Date of Patent: Jul. 2, 1985

[54] TAPE LOADING DEVICE FOR MAGNETIC RECORDING AND/OR REPRODUCING APPARATUS

[75] Inventors: Shin Okita, Atsugi; Hideo Shimizu, Hiratsuka; Noriyuki Yamazaki, Atsugi; Fumio Sekiguchi, Kawasaki; Toshihiko Chimura, Atsugi; Osamu Shinagawa, Kanagawa, all of Japan

[73] Assignee: Sony Corporation, Tokyo, Japan

[21] Appl. No.: 366,586

[22] Filed: Apr. 8, 1982

[30] Foreign Application Priority Data

Apr. 10, 1981 [JP] Japan ................... 56-54681

[51] Int. Cl.$^3$ .............................................. G11B 5/08
[52] U.S. Cl. ...................................... 360/85; 242/199
[58] Field of Search ................................ 360/84–85; 242/197–200

[56] References Cited

U.S. PATENT DOCUMENTS

| | | | |
|---|---|---|---|
| 3,784,761 | 1/1974 | Moritan | 360/85 |
| 3,831,198 | 8/1974 | Kihara | 360/85 |
| 3,969,766 | 7/1976 | Tanaka | 360/85 |
| 4,056,833 | 11/1977 | Schulz | 360/85 |

Primary Examiner—A. J. Heinz
Attorney, Agent, or Firm—Lewis H. Eslinger; Alvin Sinderbrand

[57] ABSTRACT

In a magnetic recording and/or reproducing apparatus having a rotary head drum and a mounting for a tape cassette apart from the drum; a tape loading device is provided with a support ring which is rotatable around the drum and inclined in respect to the plane containing the longitudinal median of the tape in the mounted cassette, a plurality of rotary tape guides spaced apart along the support ring and extending perpendicularly to the latter for withdrawing tape from the cassette and wrapping a portion thereof about the drum in response to turning of the support ring, and a draw-out guide which is movable toward and away from one side of the support ring in synchronism with the turning of the latter, the draw-out guide, when moved away from the support ring, being inclined relative to the plane containing the longitudinal median of the tape in the cassette such that a return run of the tape extending from the draw-out guide back to the cassette leads smoothly to the latter.

19 Claims, 24 Drawing Figures

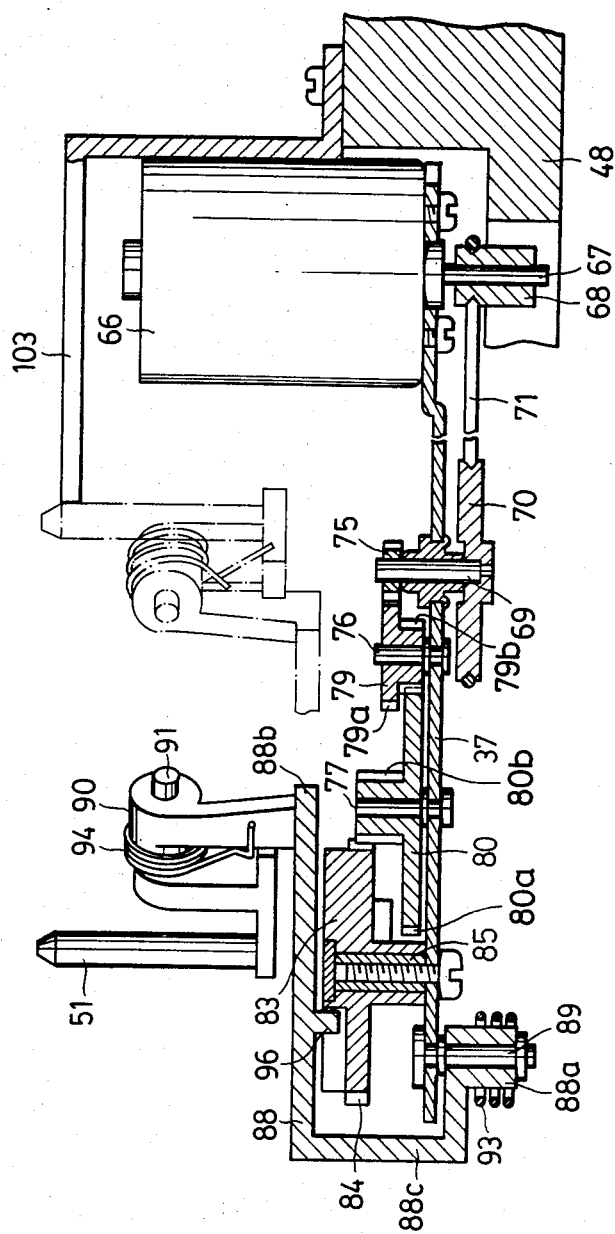

TAPE LOADING DEVICE FOR MAGNETIC RECORDING AND/OR REPRODUCING APPARATUS

BACKGROUND OF THE INVENTION

1. Field of the Invention

The present invention relates generally to a tape loading device for a magnetic recording and/or reproducing apparatus, such as, video tape recorder (VTR) or the like, and more particularly is directed to an improved tape loading device of the so-called U-loading type for use in a cassette-type helical scan VTR.

2. Description of the Prior Art

As is well known, a tape loading device for a cassette-type helical scan VTR may comprise a support ring rotatable about the rotary head drum and carrying a plurality of tape guides spaced apart along the ring and being effective, upon rotation of the support ring, to withdraw magnetic tape from a cassette suitably mounted apart from the drum and to wind or wrap the withdrawn tape about a portion, for example, approximately a 180° extent, of the circumferential surface of the rotary head drum. In order to achieve helical disposition of the tape wrapped about the rotary head drum, the support ring of the tape loading device is rotated in a plane which is inclined in respect to the usually horizontal plane containing the longitudinal median of the tape within the mounted tape cassette. By reason of such inclination of the plane of rotation of the support ring, the magnetic tape initially drawn horizontally out of the cassette by the tape guides on the ring is gradually lowered as it is helically wrapped about a portion of the circumferential surface of the rotary head drum. At its lowermost level, the tape is diverted or escapes tangentially from the surface of the drum for engagement with the capstan adapted to longitudinally drive the tape, and then the path of the tape is reverted for return of the tape to the cassette along a gradually rising course which eventually reaches the level of the mounted cassette.

In the usual tape loading device of the above described type, the tape guides provided on the support ring are fixed to the latter at successively different predetermined angles relative to the plane of rotation of the ring so that the tape withdrawn from the cassette and engaged by the plurality of tape guides on the support ring is sequentially twisted by the tape guides. Due to the sequential twisting of the tape in the course of its engagement by the plurality of tape guides fixed on the support ring at respective different angles relative to the latter, the sliding friction between the tape and the tape guides give rise to a relatively large resistance to the movement of the tape. Such large resistance to movement of the tape results in irregular travel of the tape and frequently in damage or creasing of the latter.

OBJECTS AND SUMMARY OF THE INVENTION

Accordingly, it is an object of the present invention to provide an improved tape loading device for a cassette-type helical scan VTR which avoids the foregoing disadvantages of the prior art.

More specifically, it is an object of the present invention to provide a tape loading device, as aforesaid, which permits the very smooth driving of the magnetic tape.

Another object of the present invention is to provide a tape loading device, as aforesaid, which minimizes the sliding friction between the magnetic tape and the tape guides of the loading device by which the tape withdrawn from a cassette is wrapped about the rotary head drum, whereby to avoid irregular travel and damage to the tape due to excessive sliding friction.

Still another object of the present invention is to provide a tape loading device, as aforesaid, which is reliable in operation so as to consistently achieve correct loading of the tape without damage thereto.

In accordance with an aspect of this invention, in a magnetic recording and/or reproducing apparatus having a cylindrical tape guide drum with at least one rotary magnetic head adapted to move in a circular path substantially coinciding with the outer circumferential surface of the drum, and in which a wound supply of magnetic tape, such as, a tape cassette, is mounted apart from the drum; a tape loading device comprises a support member, preferably in the form of a ring, extending around the guide drum and being rotatable in a plane that is inclined in respect to the plane containing the longitudinal median of the tape in the wound supply thereof, first tape guiding means, preferably in the form of a plurality of guide rollers rotatably mounted on the support member or ring at spaced apart locations along the latter, extending perpendicularly in respect to the plane of rotation of the support member, such first tape guiding means being response to rotation of the support member for withdrawing tape from the wound supply thereof and wrapping a portion thereof helically about the outer circumferential surface of the guide drum, and second tape guiding means operated in synchronism with the rotation of the support member or ring to move from a first position adjacent the wound supply of tape to a second position spaced from the latter and in which the second tape guiding means engages the tape withdrawn from the wound supply between the latter and the first guiding means, with the second tape guiding means, in its second position, being inclined relative to the plane containing the longitudinal median of the tape in the wound supply such that a run of the tape extending between the second tape guiding means and the wound supply of tape is lead smoothly back to the latter.

In the foregoing arrangement according to an aspect of the invention, upon the completion of a tape loading operation, the rotary tape guide rollers mounted on the support ring and constituting the first tape guiding means all have their axes extending at right angles to the longitudinal median of the tape contacted thereby so that there is a minimum of resistance to movement of the tape imposed by such tape guide rollers. Thus, only the second tape guiding means, which is desirably in the form of a draw-out guide located at one side of the support ring, extends at an angle with respect to the longitudinal median of the tape engaged thereby at the completion of the tape loading operation so as to impose any significant sliding frictional resistance to the movement of the tape.

The above, and other objects, features and advantages of the invention, will be apparent in the following detailed description of an illustrative embodiment thereof which is to be read in connection with the accompanying drawings wherein the same reference numerals are used to identify the same or corresponding parts in the several views.

BRIEF DESCRIPTION OF THE DRAWINGS

FIG. 7 is a sectional view showing a transmission included in the drive of FIGS. 6A and 6B for driving the draw-out guide assembly thereof;

DETAILED DESCRIPTION OF A PREFERRED EMBODIMENT

Figure 1:
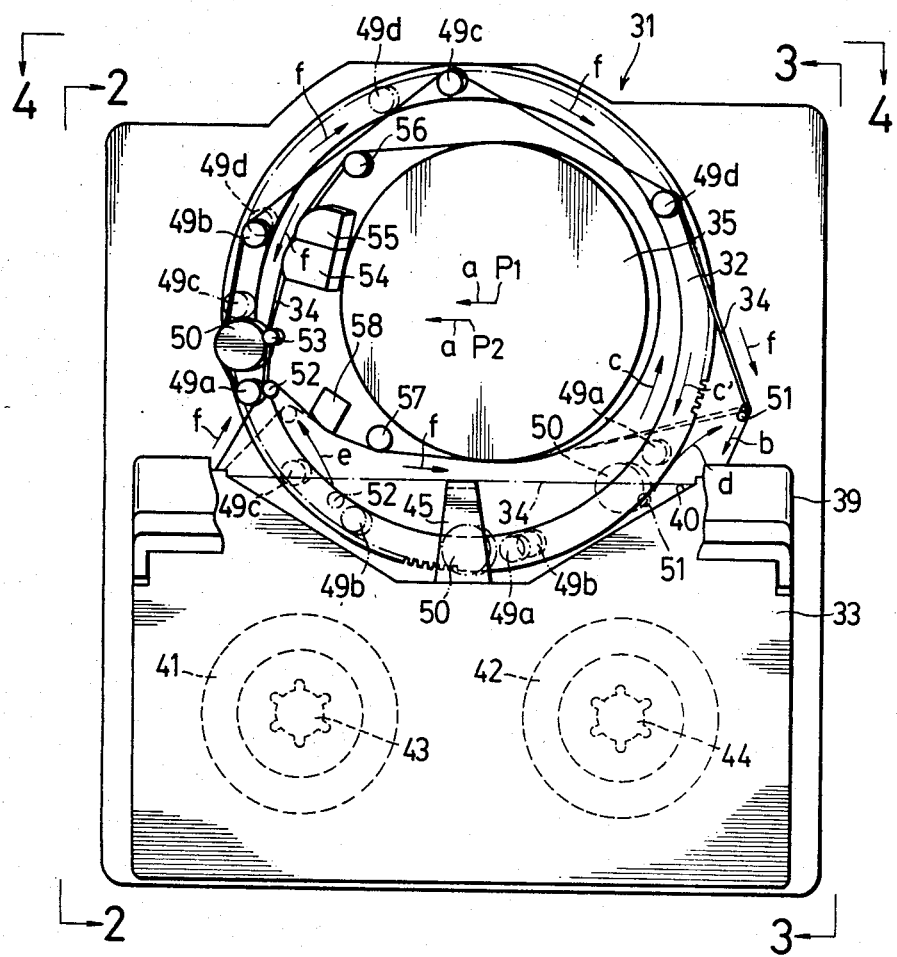
FIG. 1 is a schematic plan view generally showing the overall arrangement of a tape loading device for a cassette-type helical scan VTR according to an embodiment of the present invention.

Referring to the drawings in detail, and initially to FIG. 1, it will be seen that a tape loading device 31 of the U-loading type for a cassette-type helical scan VTR is there shown to generally comprise a support ring 32 having tape guides thereon, as hereinafter described in detail, which are effective upon rotation of ring 32, to withdraw a magnetic tape 34 from a suitably mounted tape cassette 33, and to helically wrap the withdrawn tape around the circumferential surface of a rotary head drum 35. More particularly, the VTR provided with tape loading device 31 is shown to include a base plate or chassis 37 having a plurality of positioning or locating pins 38 thereon (FIG. 3) for horizontally positioning or mounting tape cassette 33. When tape cassette 33 is thus mounted, a lid 39 pivoted at the front of the cassette housing is opened to expose a front opening 40 across which a run of the magnetic tape 34 extends, as indicated by the dot-dash line on FIG. 1. Furthermore, when tape cassette 33 is mounted on positioning pins 38, a supply reel 41 and a take-up reel 42 on which the tape 34 is wound within the tape cassette are respectively engaged with a supply reel shaft 43 and a take-up reel shaft 44 which are rotatably arranged on chassis 37. Further, as shown on FIG. 1, tape cassette 33 includes a tape guard fence 45 of inverted L-shape formed integrally with the upper wall of the cassette housing and engaging in back of the run of tape 34 which extends across opening 40 when the tape cassette is not in use.

The rotary head drum 35 is disposed in a substantially laterally centered position in front of the mounted tape cassette 33, and support ring 32 extends around the outer circumference of drum 35 and is eccentrically located in respect to the latter. Rotary head drum 35 and support ring 32 are mounted on a base 48 (FIG. 4) which is inclined relative to chassis 37. As shown on FIG. 4, the central axis $P_1$ of rotary head drum 35 is inclined from the vertical or reference line $P_o$ by an angle $\theta_1$ of 5° in the direction of the arrow a on FIG. 1. The central axis $P_2$ of support ring 32 normal to the plane of rotation of the latter is inclined from the vertical or reference line $P_o$ by an angle $\theta_2$ of 10° also in the direction indicated by the arrow a on FIG. 1. Therefore, the plane of rotation of the rotary head or heads (not shown) included in rotary head drum 35 is inclined by an angle of 5° with respect to a horizontal or reference plane L of mounted tape cassette 33, and hence in respect to the plane containing the longitudinal median line of the tape wound on reels 41 and 42 within mounted cassette 33. Support ring 32, on the other hand, is rotatable in a plane which is inclined by an angle of 10° in respect to the plane containing the longitudinal median of the tape in mounted cassette 33.

Four rotary guide rollers 49a, 49b, 49c and 49d, constituting the tape guides for withdrawing and wrapping the tape during a loading operation, are mounted on support ring 32 at locations spaced apart along the latter and are rotatable about respective axes normal to support ring 32, so that each of such axes is inclined from a normal or perpendicular to the horizontal or reference plane L of tape cassette 33 by an angle of 10°. A pinch roller 50 is also mounted on support ring 32 between guide rollers 49a and 49b, but relatively close to the first guide roller 49a, and pinch roller 50 is also supported so as to be rotatable about an axis normal to the plane of support ring 32. In the course of a loading operation, the tape 34 withdrawn from cassette 33 is also acted upon by a draw-out guide pin 51 and a tension regulator element 52 generally disposed at opposite sides of drum 35. At the completion of a tape loading operation, draw-out guide pin 51 functions as a stationary tape guide in a forwardly displaced position indicated in full lines on FIG. 1, and in which the longitudinal axis $P_3$ of draw-out guide pin 51 is inclined by a predetermined angle $\theta_3$ (FIG. 3) from the vertical or reference line $P_0$ in the direction indicated by the arrow b on FIG. 1. On the other hand, tension regulator element 52 is mounted so as to be perpendicular in respect to the horizontal or reference plane L of the mounted tape cassette 33 at all times.

Also mounted on chassis 37 are a capstan 53, a CTL head 54 for recording and reproducing control signals in a longitudinal track on tape 34 and which also serves as an audio recording and reproducing head, an audio erase head 54, an exit guide 56 for leading the tape 34 tangentially away from the surface of drum 35, an inlet guide 57 for leading the tape to the circumferential surface of drum 35 and a full-width erase head 58 (FIG. 1). Capstan 53, CTL head 54, audio erase head 55 and exit guide 56 are all oriented parallel to guide rollers 49a–49d on support ring 32, and thus are each inclined, by an angle of 10°, from the perpendicular to the horizontal or reference plane L of the mounted tape cassette. On the other hand, inlet guide 57 and full-width erase head 58 are mounted perpendicular to the horizontal or reference plane L of the mounted tape cassette.

In the fully unloaded state of device 31, guide rollers 49a–49d and pinch roller 50 are in their fully unloaded or inactive positions indicated by the dot-dash lines on FIG. 1. At such time, draw-out guide pin 51 and tension regulator element 52 are also in fully unloaded or rearwardly disposed inactive positions indicated in dot-dash lines on FIG. 1, and there shown to be close to support ring 32. When tape cassette 33 is placed downwardly on positioning pins 38 so as to be thereby mounted or loaded in the VTR, with its lid 39 opened, first and second guide rollers 49a and 49b and pinch roller 50 on support ring 32, and also draw-out guide pin 51 and tension regulator element 52 are inserted upwardly into opening 40 of the mounted cassette and are thereby positioned in back of the run of the tape 34 extending laterally across cassette opening 40, as indicated in dot-dash lines on FIG. 1. When the mounting or loading of tape cassette 33 in the VTR is conventionally detected by a switch (not shown), support ring 32 is driven, as hereinafter described, in the counterclockwise direction indicated by the arrow c on FIG. 1. As a result, the tape 34 in the run extending across cassette opening 40 is caught or engaged by the first guide roller 49a, and, as the rotation of support ring 32 continues in the direction of the arrow c, the corresponding movement of guide roller 49a is effective to gradually or progressively draw the tape outwardly from the cassette and to wrap the withdrawn tape 34 in the counterclockwise direction, as viewed on FIG. 1, about the outer circumferential surface of rotary head drum 35. In synchronism with the rotation of support ring 32 in the direction of arrow c, draw-out guide pin 51 is moved, as hereinafter described in detail, in the direction indicated by the arrow d on FIG. 1. Draw-out guide pin 51 reaches its forwardly displaced or operative position indicated in solid lines on FIG. 1, and is thereafter fixed in such position, when first guide roller 49a attains an intermediate position indicated in broken lines on FIG. 1. Further, in synchronism with the forward movement of draw-out guide pin 51, tension regulator element 52 is moved in the direction indicated by the arrow e on FIG. 1, as hereinafter described in detail, and comes to a temporary halt in the pause position indicated in broken lines.

By reason of the inclination of the plane of rotation of support ring 32 at an angle of 10° from the horizontal, as ring 32 is turned in the direction of arrow c on FIG. 1, the second, third and fourth guide rollers 49b, 49c and 49d successively follow first guide roller 49a and move from a lowermost level, when to the left of drum 35 as viewed on FIG. 1, to an uppermost position when disposed to the right of drum 35. Thus, guide rollers 49b, 49c and 49d, in following the first guide roller 49a, sequentially enter the loop of tape 34 by passing under the tape, when at the lowermost level, and then rise within the tape loop and engage the tape in moving toward the uppermost level. After guide roller 49a, pinch roller 50 and guide rollers 49b–49d, in sequence, past the portion of support ring 32 to the right of drum 35, and at which they attain their highest level, the guide rollers 49a–49d and pinch roller 50 are gradually lowered with continued turning of ring 32 in the direction of arrow c on FIG. 1. The loading operation is completed when support ring 32 is turned through approximately 270°, whereupon, guide rollers 49a–49d and pinch roller 50 reach the respective positions shown in solid lines on FIG. 1. Immediately before the completion of the loading operation, tension regulator element 52 is further moved in the direction of the arrow e on FIG. 1 from the pause or temporary position shown in broken lines to the final or operative position indicated in full lines on FIG. 1. Completion of the loading operation is conventionally detected by a switch (not shown), whereupon the driving of support ring 32 is halted and ring 32 is locked in its operative or loaded position.

Figure 2:
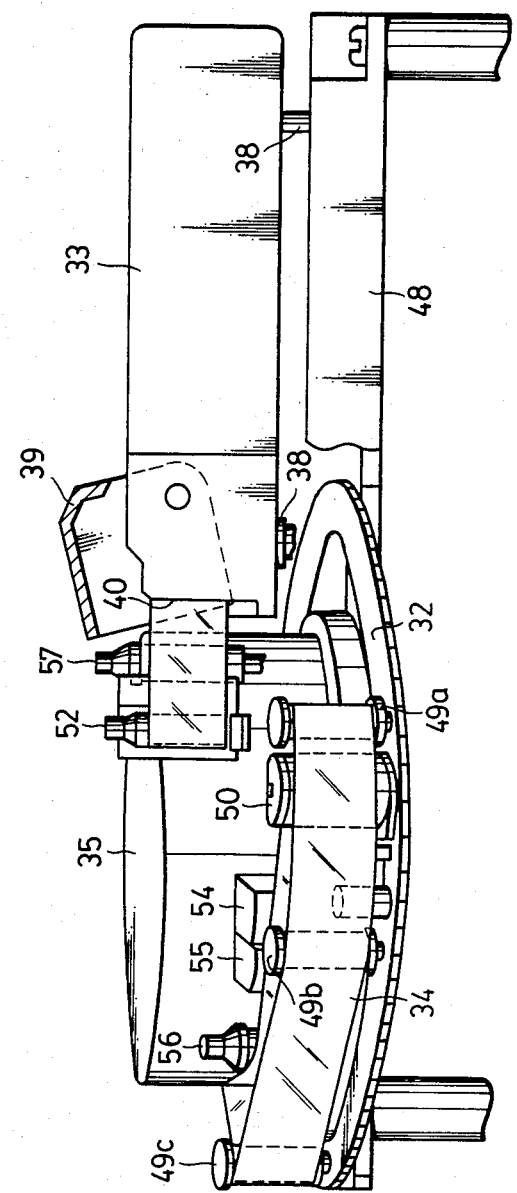
FIG. 2 is a schematic side elevational view of the arrangement of FIG. 1 as viewed in the direction of the arrows 2—2 on FIG. 1.
Figure 3:
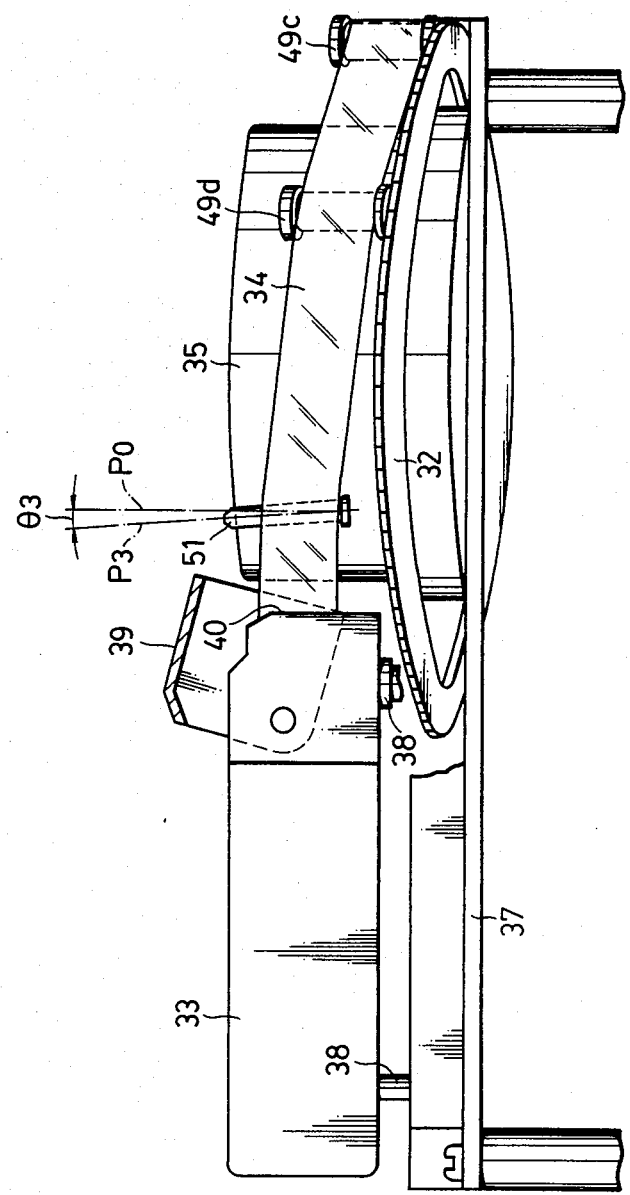
FIG. 3 is a schematic side elevational view of the arrangement shown on FIG. 1, but as viewed in the direction of the arrows 3—3 on FIG. 1.
Figure 4:
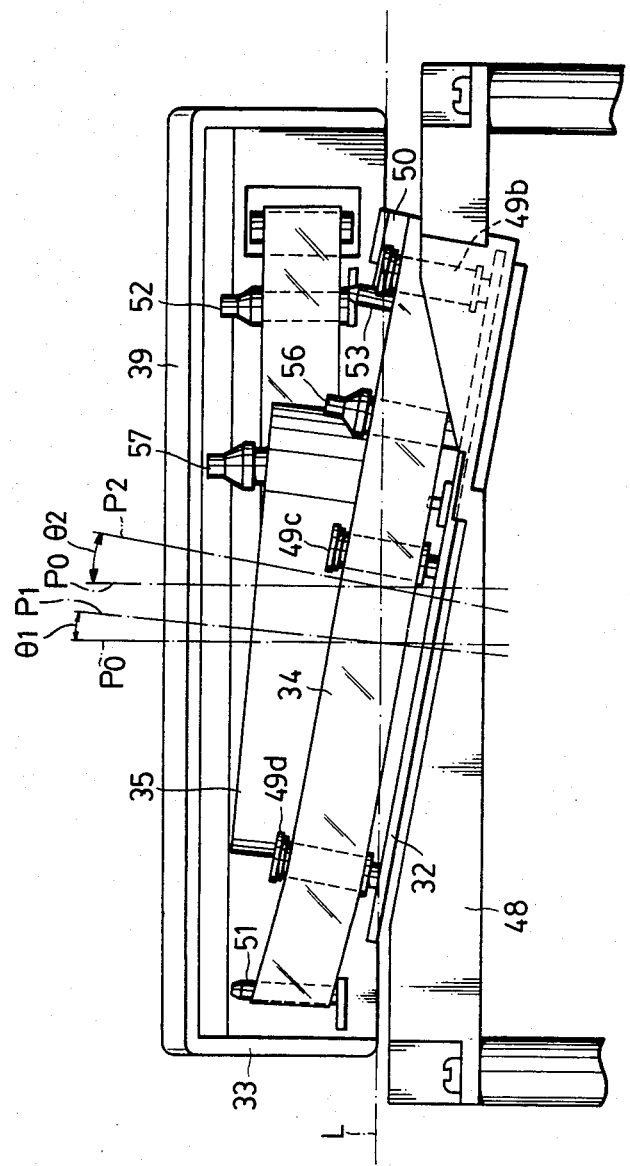
FIG. 4 is a schematic elevational view of the arrangement shown on FIG. 1 as viewed from the rear thereof, that is, as viewed in the direction of the arrows 4—4 on FIG. 1.

When the loading operation is completed, the path of the magnetic tape is that indicated by the solid lines on FIG. 1, and as shown on FIGS. 2-4. In such path of tape 34, the tape is guided past full-width erase head 58 and inlet guide 57 to the circumferential surface of drum 35, and then from drum 35 past exit guide 56, audio erase head 55 and CTL head 54 to between capstan 53 and pinch roller 50. Since the planes of rotation of the head or heads of drum 35 and of support ring 32 are at an angle of 5° in respect to each other, tape 34 is helically wrapped about the circumferential surface of drum 35 to an angular extent of 180°+α with a lead angle of 5°.

When a recording or reproducing button (not shown) is depressed or actuated with device 31 in its fully loaded condition, pinch roller 50 is made to press tape 34 against capstan 53 so that the tape is driven at the normal speed in the longitudinal direction indicated by the arrows f on FIG. 1, whereby to effect the desired recording or reproducing operation of the VTR. During such recording or reproducing operation, tape 34 is drawn horizontally from supply reel 41 in tape cassette 33, as shown on FIG. 2, and is guided to the circumferential surface of rotary head drum 35 by means of tension regulator element 52, full-width erase head 58 and inlet guide 57. Then, tape 34 is guided obliquely downward, at an angle of 10° in respect to the horizontal or reference plane L, along the circumferential surface of drum 35, as shown on FIGS. 3 and 4, and is directed to guide roller 49a by way of exit guide 56, audio erase head 55, CTL head 54 and capstan 53. The path of tape 34 is reverted or turned through 180° about guide roller 49a and is guided obliquely upward at an angle of 10° relative to the horizontal by means of pinch roller 50 and guide rollers 49b, 49c and 49d to draw-out guide pin 51. At draw-out guide pin 51, the returning tape 34 is restored substantially to the same level as tape cassette 33 (FIG. 3). By means of the inclination of draw-out guide pin 51 in its operative position, tape 34 engaging such pin is twisted so as to be thereafter guided substantially horizontally into cassette 33 for take-up or rewinding on reel 42 therein.

It will be appreciated that, in the above generally described tape loading device 31 according to this invention, at the completion of a tape loading operation, the tape 34 is twisted only at its engagement with draw-out guide pin 51, and nowhere else. Accordingly, tape 34 withdrawn from cassette 33 is very smoothly driven past tension regulator element 52, rotary head drum 35, capstan 53, rotary guide 49a, pinch roller 50 and guide roller 49b-49d without being twisted until the tape comes into engagement with draw-out guide pin 51. Since guide rollers 49a-49d on support ring 32 for guiding tape 34 are all freely rotatable, tape 34 is subjected to only a minimal frictional resistance to its movement by engagement with guide rollers 49a-49d and, therefore, the smooth travel of the tape is promoted. Further, since tape 34, when being guided by guide rollers 49a-49d on support ring 32, has the median line of the tape extending at right angles to the axes of guide rollers 49a-49d, which axes are all perpendicular to the plane of support ring 32, the tension in tape 34 does not cause inadvertent movement of the tape axially along the guide rollers so that tape 34 is driven in an extremely stable manner.

When an eject button (not shown) is actuated or depressed after completion of a recording or reproducing operation, support ring 32 is turned in the direction indicated by the arrow c' on FIG. 1, and an unloading operation. The procedure for such unloading operation is the reverse of the procedure described above for a loading operation and, in the course thereof, tape 34 is unwrapped from the circumference of drum 35 and progressively returned to cassette 33 in which one or the other of reels 41 and 42 is rotated for taking up the slackened tape. At the completion of the tape unloading operation, guide rollers 49a-49d, pinch roller 50, draw-out guide element 51 and tension regulator element 52 are all returned to the positions indicated in dot-dash lines on FIG. 1, with the tape restored to its straight run extending across cassette opening 40, as also shown in dot-dash lines, so that, if desired, tape cassette 33 may be removed upwardly from the VTR.

Figure 5:
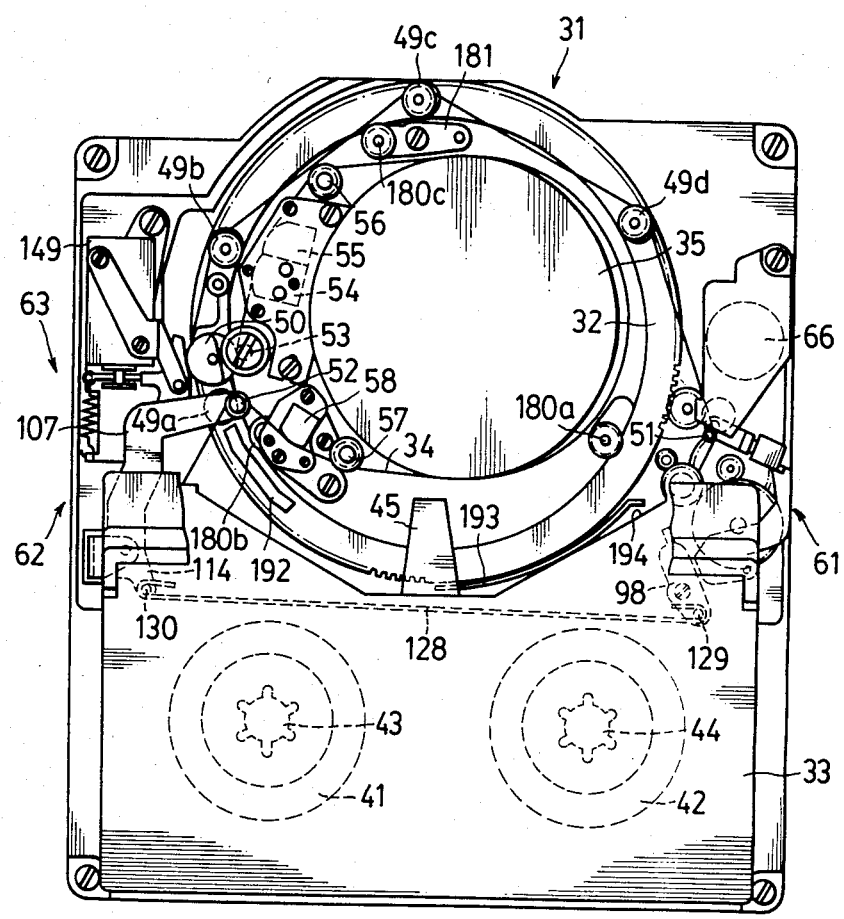
FIG. 5 is a top plan view of a cassette-type helical scan VTR having a tape loading device according to the embodiment of the invention schematically illustrated on FIGS. 1–4, and showing additional details and components thereof.

Referring now to FIG. 5, it will be seen that, in the illustrated VTR having a tape loading device 31 according to an embodiment of this invention, there are further provided on chassis 37 at locations outside the periphery of support ring 32, a drive mechanism 61 for support ring 32 and draw-out guide pin 51, a tension regulator mechanism 62 including tension regulator element 52, and a pinch roller press mechanism 63 for pressing pinch roller 50 against capstan 53 when it is desired to drive tape 34 in a recording or reproducing operation.

A specific structural arrangement of drive mechanism 61 will now be described in detail with reference to FIGS. 6A, 6B and 7-12. As shown particularly on FIG. 7, a reversible electric motor 66 is mounted on chassis 37 and has a downwardly projecting motor shaft 67 on which a drive pulley 68 is secured below chassis 37. An intermediate shaft 69 is rotatably mounted in a suitable bearing supported by chassis 37 and, at its lower end, shaft 69 has a pulley 70 secured thereto to be driven by a belt 71 running around pulleys 68 and 70. As shown particularly on FIGS. 6A, 6B and 8, a ring drive gear 73 is rotatably supported on an inclined shaft 74 which is fixedly mounted on chassis 37 adjacent the other periphery of support rings 32. A gear 75 is fixed to the upper end of intermediate shaft 69 and a gear train, comprised of gear members 79, 80 and 81 rotatable on shafts 76, 77 and 78, respectively, secured to chassis 37, is provided for transmitting the rotation of gear 75 to gear 73. More particularly, as shown on FIG. 8, gear member 79 includes an upper gear 79a meshing with gear 75 and an integral lower gear 79b meshing with a lower gear 80a of gear member 80 which further includes an integral upper gear 80b. Lower member 80a also meshes with a lower gear 81a of gear member 81 which further includes an integral upper gear 81b meshing with drive gear 73. Further, a ring gear 82 is formed on the outer periphery of support ring 32 and is in meshing engagement with drive gear 73. Thus, in dependence upon the direction of rotation of reversible electric motor 66, support ring 32 is driven either in the forward direction indicated by arrow c for a tape loading operation or in the reverse direction indicated by the arrow c' for a tape unloading operation by means of the previously described transmission between motor shaft 67 and drive gear 73.

Figure 6A:
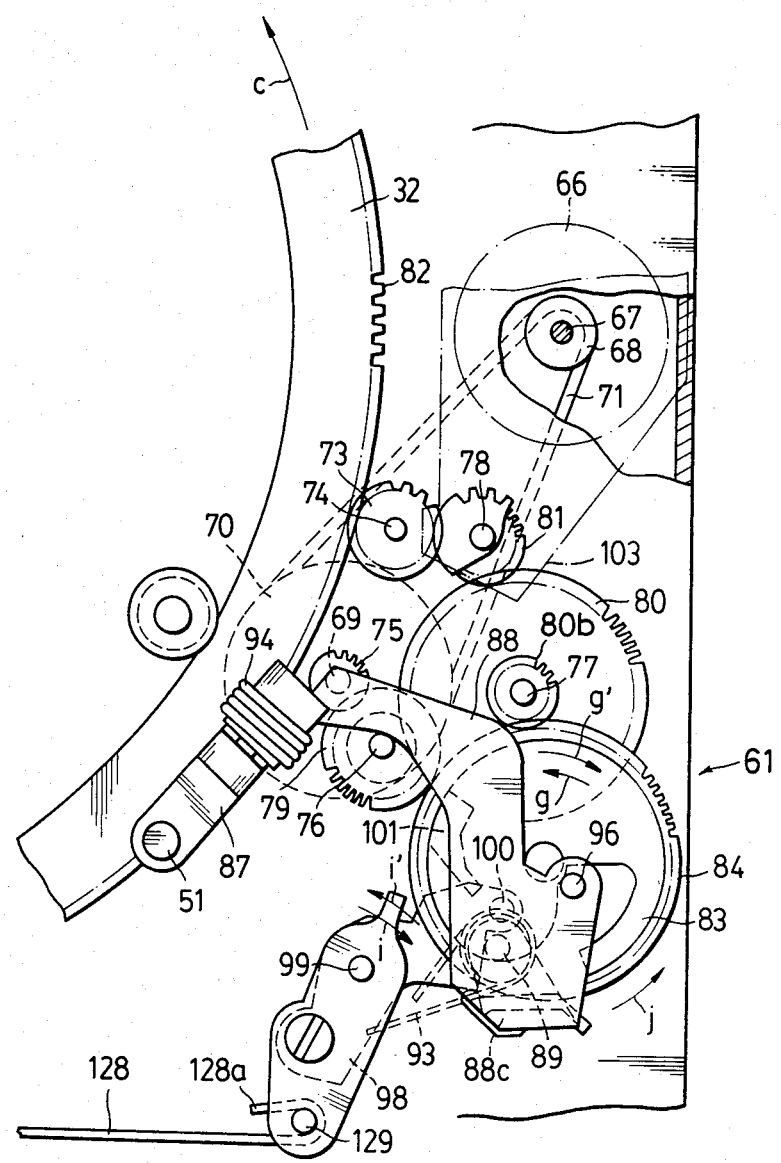
FIGS. 6A and 6B are fragmentary, enlarged plan views showing a drive for the tape loading device of FIG. 5 and a draw-out guide assembly thereof in two different conditions of the latter.
Figure 9:
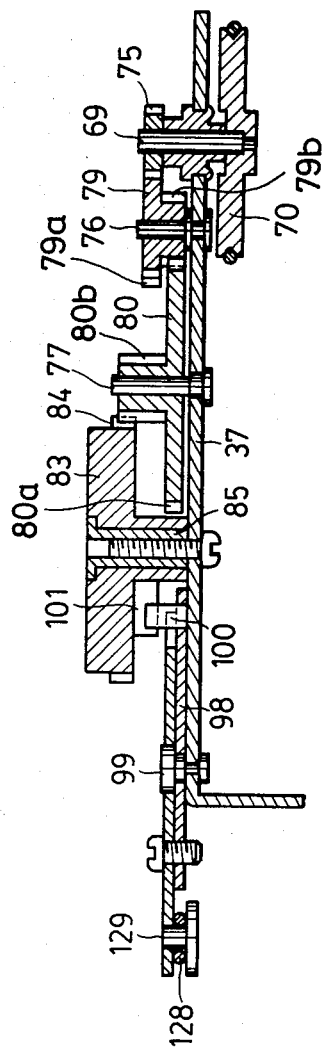
FIG. 9 is a sectional view of another portion of the transmission included in the drive illustrated on FIGS. 6A and 6B.
Figure 10:
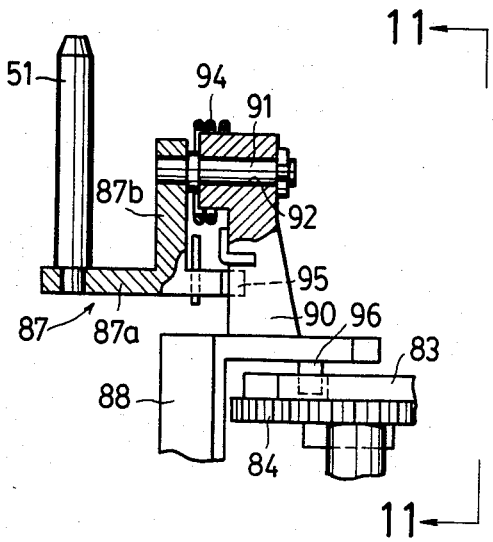
FIG. 10 is a detailed elevational view, partly broken away and in section, and particularly showing the mounting for a draw-out guide included in the assembly of FIGS. 6A and 6B.
Figure 11:
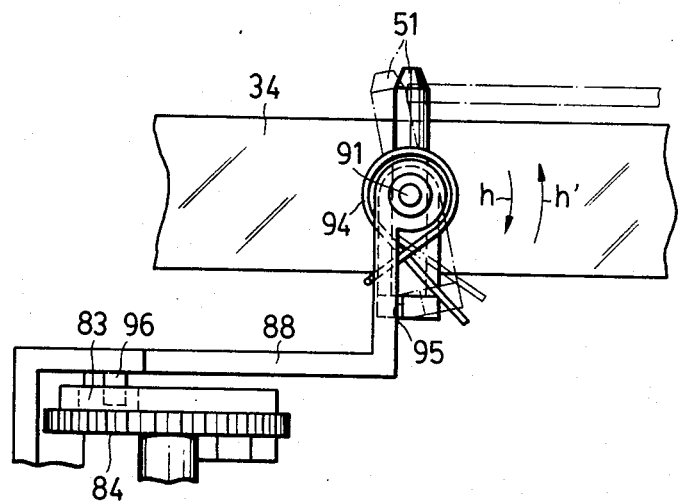
FIG. 11 is a detailed elevational view of the structure of FIG. 10 as viewed in the direction of the arrow 11—11 on FIG. 10.

As shown on FIGS. 6A, 7 and 9, a cam 83 integral with a cam gear 84 is rotatably supported on a shaft 85 which is fixed to chassis 37 at a location such that cam gear 84 meshes with upper gear 80b of gear member 80 so as to be driven by the latter and thereby provide the motive force for draw-out guide pin 51. As shown particularly in FIGS. 10-12, draw-out guide pin 51 is mounted on a rockable support member 87 which is suspended from a swingable support lever 88. The swingable support lever 88 is generally of C-shaped configuration, as shown on FIGS. 7 and 12, and includes a relatively short lower arm 88a, a relatively long laterally curved upper arm 88b and a vertical connecting portion 88c therebetween. Lower arm 88a of lever 88 terminates in a boss which is rotatable on a shaft 89 fixedly depending from chassis 37 adjacent fixed shaft 85. An upwardly directed bracket 90 is formed integrally with the free end portion of upper arm 88b and carries a horizontally directed shaft 91 in a bore 92 for pivotally supporting a rockable support 87. More particularly, rockable support 87 is shown to be of substantially inverted T-shaped configuration with draw-out guide pin 51 being fixed to and directed upwardly from one end of a horizontal portion 87a at the bottom of support 87. Further, a stem or upwardly directed portion 87b of inverted T-shaped support 87 is fixed, at its upper end, to shaft 91 which is turnable in bore 92 at the upper end of bracket 90. Swingable lever 88 is biased about shaft 89 in the direction of the arrow g on FIG. 6A by means of a torsion spring 93 which extends around the pivoted boss on lower arm 88a of lever 88 and which has its opposite ends suitably abutting against lever 88 and an anchor or stop (not shown) on chassis 37. Rockable support 87 is biased to rock relative to lever 88 in the direction of the arrow h on FIG. 11 by means of a torsion spring 94 which is concentric with pivot shaft 91 and has its opposite end portions abutting against bracket 90 and rockable support 87. The rocking of support 87 in the direction of arrow h by means of torsion spring 94 is limited by a stop or projection 95 extending integrally from the end of horizontal portion 87a remote from pin 51 and being engagable against a side surface of bracket 90. In such limited position established by the engagement of stop 95 against the adjacent side surface of bracket 90, draw-out guide pin 51 is vertically oriented, as shown by the solid lines on FIG. 11.

Figure 12:
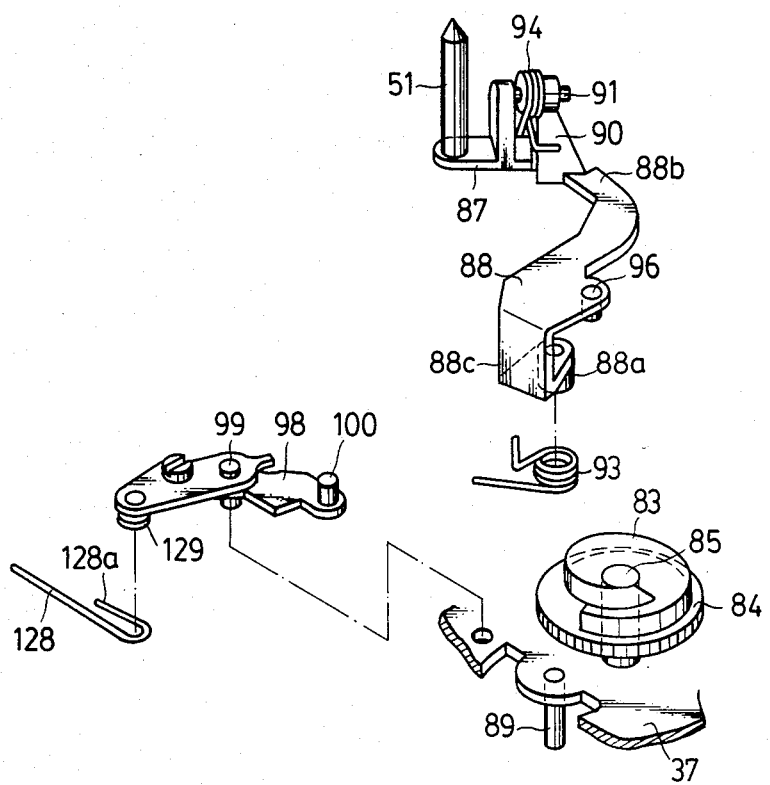
FIG. 12 is an exploded perspective view of a number of the elements included in the draw-out guide assembly of FIGS. 6A and 6B.

Cam 83 which is integrally formed above cam gear 84 has a substantially spiral configuration, as is particularly apparent on FIG. 12, and a cam follower pin 96 depends from upper arm 88b of lever 88 and is urged into engagement with spiral cam 84 by the force of spring 93 urging lever 88 in the direction of arrow g on FIG. 6A. The spiral configuration of cam 83 is designed so that, when cam 83 is turned in the direction of the arrow j through approximately 90° from the position shown on FIG. 6A, cam follower pin 96 will have moved from a minimum radius portion of cam 83 to a maximum radius portion 83a of the cam which has approximately a 270° extent. Thus, swinging movement of lever 88 from the position shown on FIG. 6A to the position shown on FIG. 6B is effected during approximately ¼ of a revolution of cam 83 from the position shown on FIG. 6A and, during the remainder of the revolution of cam 83 to the position shown on FIG. 6B, cam follower pin 96 continues to engage the maximum radius portion 83a of the cam and lever 88 remains in the position shown in FIG. 6B.

As shown particularly on FIGS. 6A, 9 and 12, an interlocking lever 98 is pivoted on a pivot pin 99 fixed to chassis 37 adjacent cam gear 84. Interlocking lever 98 is biased in the direction indicated by the arrow i on FIG. 6A, as hereinafter described in detail, so as to engage the vertical connecting portion 88c of swinging lever 88. A pin 100 is directed upwardly from one end of interlocking lever 98 and is engagable by a projection 101 (FIGS. 6A, 6B and 9) depending from the lower surface of cam gear 84.

Figure 6B:
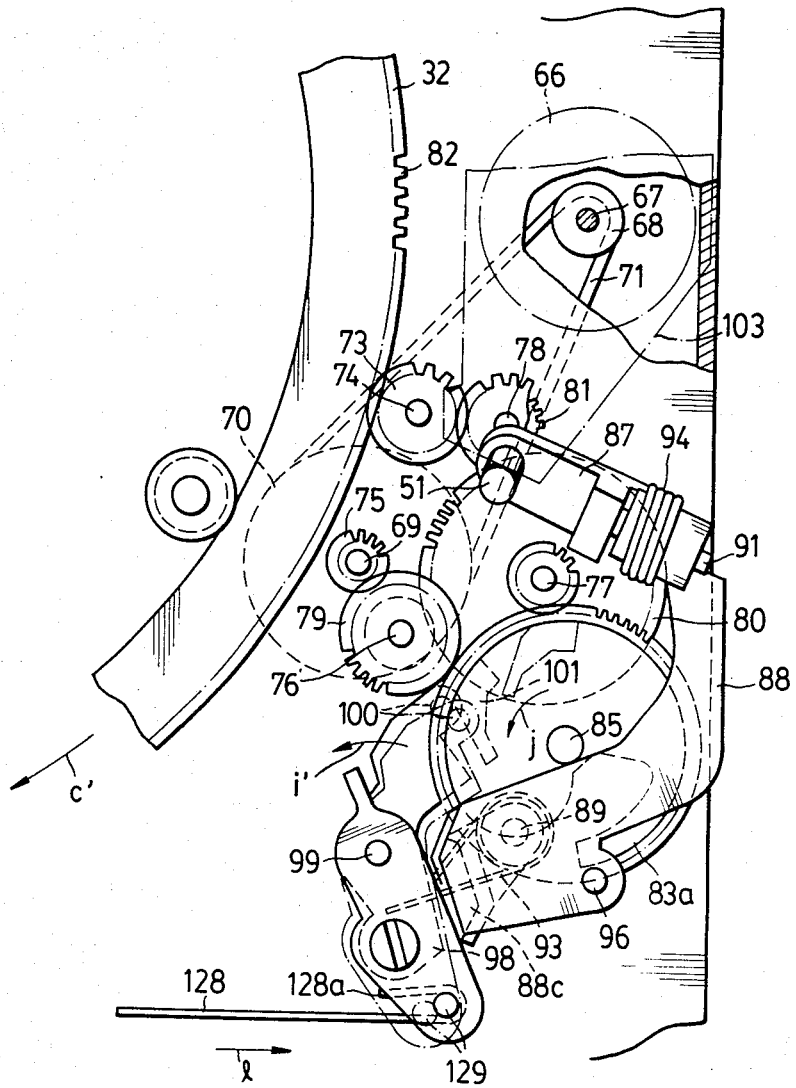
Figure 8:
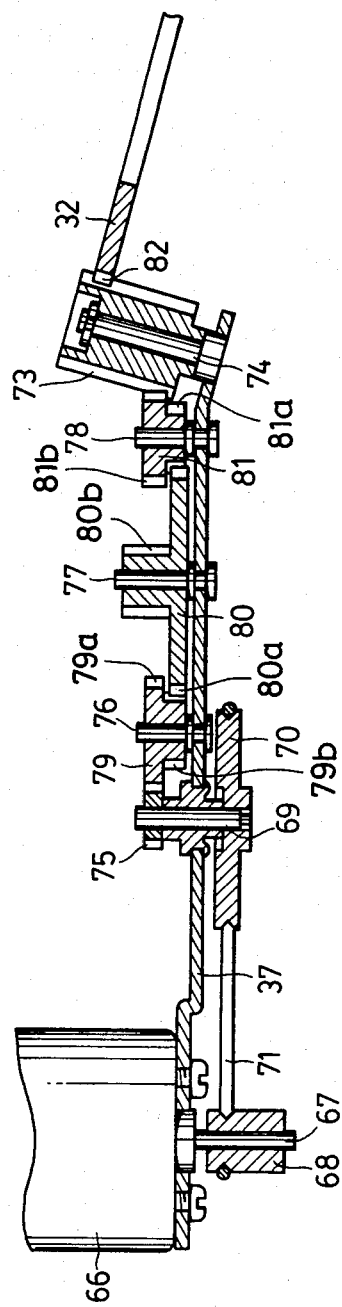
FIG. 8 is a sectional view showing a transmission included in the drive of FIGS. 6A and 6B for driving the tape loading device.

As shown on FIGS. 6A, 6B and 7, a guide positioning plate 103 is fixedly mounted above chassis 37 and is positioned to be engaged by the upper end portion of draw-out guide pin 51 for inclining the latter upon movement of lever 88 from the position shown on FIG. 6A to the position shown on FIG. 6B. More particularly, if it is assumed that tape loading device 31 is initially in its fully unloaded condition, swinging lever 88 is then in the position shown on FIG. 6A and draw-out guide pin 51 extends vertically due to the action of torsion spring 94 in engaging stop 95 with bracket 90. When motor 66 is operated in the forward direction for causing drive gear 73 to turn support ring 32 in the direction of the arrow c on FIG. 6A, and thereby effect a loading operation, as described above, cam gear 84 is simultaneously rotated in the direction of arrow j on FIG. 6A through the action of gear member 80. As a result of turning of cam gear 84 in the direction of arrow j, swinging lever 88 is turned in the direction of the arrow g' on FIG. 6A against the force of torsion spring 93, and draw-out guide pin 51 is similarly moved in the direction of the arrow d on FIG. 1, that is, from the position shown on FIG. 6A toward the position shown on FIG. 6B.

When turning of support ring 32 in the direction of the arrow c has progressed to the extent that is effective to move guide roller 49a from the position indicated by dot-dash lines on FIG. 1 to the position indicated by broken lines, cam 83 will have been turned through approximately 90° from the position shown on FIG. 6A so that lever 88 and draw-out guide pin 51 will have been moved to the position shown on FIG. 6B in response to the engagement of cam follower pin 96 with the maximum radius portion 83a of cam 83. During the remaining turning of ring 32 in the direction of the arrow c for completing the tape loading operation and bringing guide roller 49a to its position indicated in full lines on FIG. 1, cam gear 84 continues to be turned in the direction of the arrow j to the final position shown on FIG. 6B and, during such additional turning of cam gear 84, cam follower pin 96 continues to ride on the extended maximum radius portion 83a of cam 83 for maintaining lever 88 in the position shown on FIG. 6B.

It will be appreciated that, just before the final increment of swinging movement of lever 88 to the position shown on FIG. 6B, the upper end portion of draw-out guide pin 51 engages against an edge of guide positioning plate 103, for example, as shown in dot-dash lines on FIG. 7. Thereafter, during the final increment of the swinging movement of lever 88 to the position shown on FIG. 6B, the action of guide positioning plate 103 against guide pin 51 causes tilting of the latter and of its rockable support 87 in the direction of the arrow h' on FIG. 11 against the force of torsion spring 94. Therefore, when lever 88 attains the position shown on FIG. 6B, draw-out guide pin 51 supported thereby is disposed in an inclined position to serve as an inclined fixed guide for the tape 34. It will be seen on FIG. 11 that the axis of pin 91 about which support 87 is rockable, and hence the center of turning of draw-out guide pin 51 when the latter is inclined, coincides substantially with the longitudinal median of the guided tape 34.

It will be apparent from the foregoing that draw-out guide pin 51 is erect or vertical during its movement from the position shown on FIG. 6A substantially to the position shown on FIG. 6B, during which time the axis of guide pin 51 is substantially perpendicular to the longitudinal median of the tape 34 being engaged thereby. It is only at the forwardly displaced position of draw-out guide pin 51 that the latter is inclined, as indicated by the dot-dash lines on FIG. 11, to serve as a stationary inclined guide for the tape which is thereafter being made to follow a downwardly sloping path in response to the movement of guide roller 49a with ring 32 beyond the position shown in broken lines on FIG. 1.

It is further to be noted that, as swinging lever 88 is turned in the direction of the arrow g' on FIG. 6A, its vertical connecting portion 88c acts against interlocking lever 98 to turn the latter in the direction indicated by the arrow i' on FIG. 6A. Such engagement of connecting portion 88c of lever 88 with interlocking lever 98 is effective to move the latter to the position shown in dot-dash lines on FIG. 6B when lever 88 attains the position shown on FIG. 6B, that is, as soon as ring 32 has turned in the direction of the arrow c to the extent sufficient to move first guide roller 49a to the position shown in broken lines on FIG. 1. Thereafter, during the remainder of the tape loading operation, interlocking lever 98 remains in the position shown in dot-dash lines on FIG. 6B until, during the final increment of turning of cam 83 in the direction of the arrow j on FIG. 6B, projection or abutment 101 depending from cam gear 84 acts against pin 100 on lever 98 to further turn the latter in the direction of the arrow i' to the position shown in full lines on FIG. 6B. The foregoing movements of interlocking lever 98 are effected for causing the desired operation of tension regulator mechanism 62, as hereinafter described in detail.

Upon the completion of a tape loading operation, motor 66 may be rotated in the reverse direction so as to turn support ring 32 in the direction of the arrow c' on FIG. 6B, and to cause device 31 to effect a tape unloading operation, as earlier described. In the course of such tape unloading operation, draw-out guide pin 51, swinging lever 88 and interlocking lever 98 are restored to their respective positions shown on FIG. 6A.

Figure 13A:
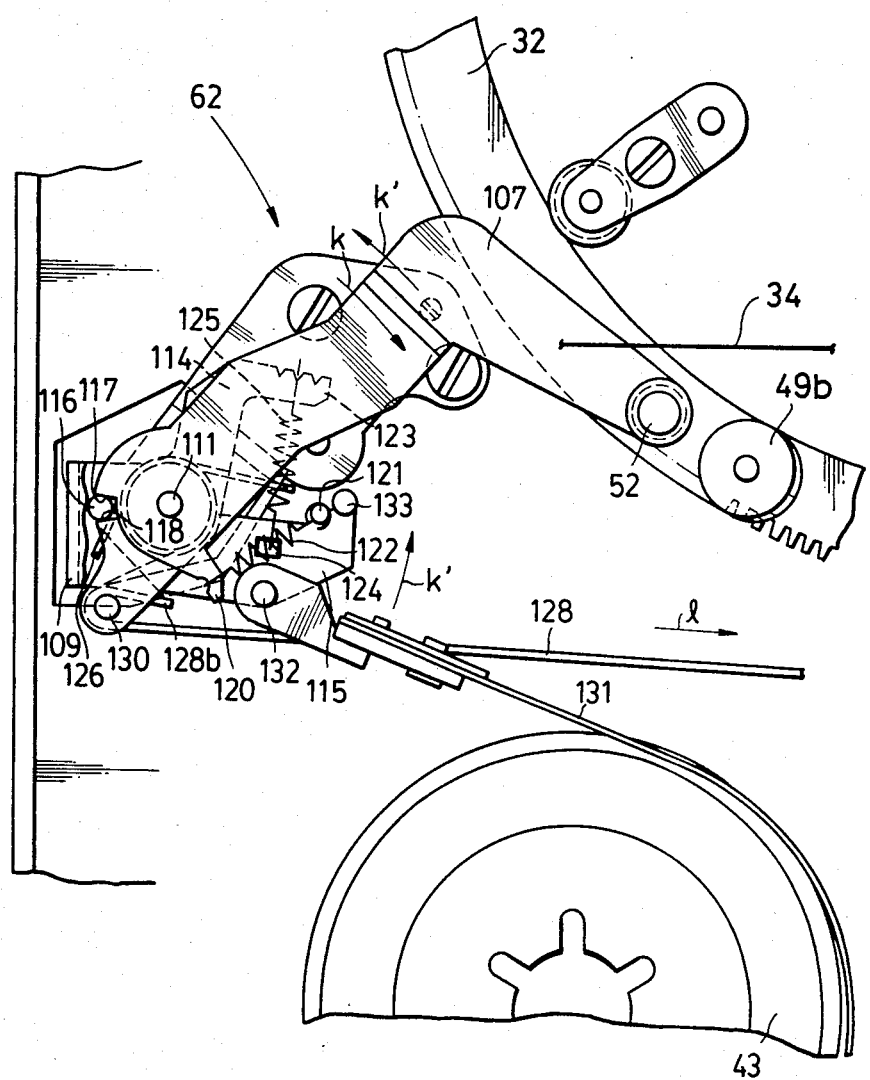
FIGS. 13A and 13B are enlarged fragmentary plan views of a tension regulator mechanism included in the cassette-type helical scan VTR of FIG. 5, and which is shown in respective different conditions thereof.
Figure 13B:
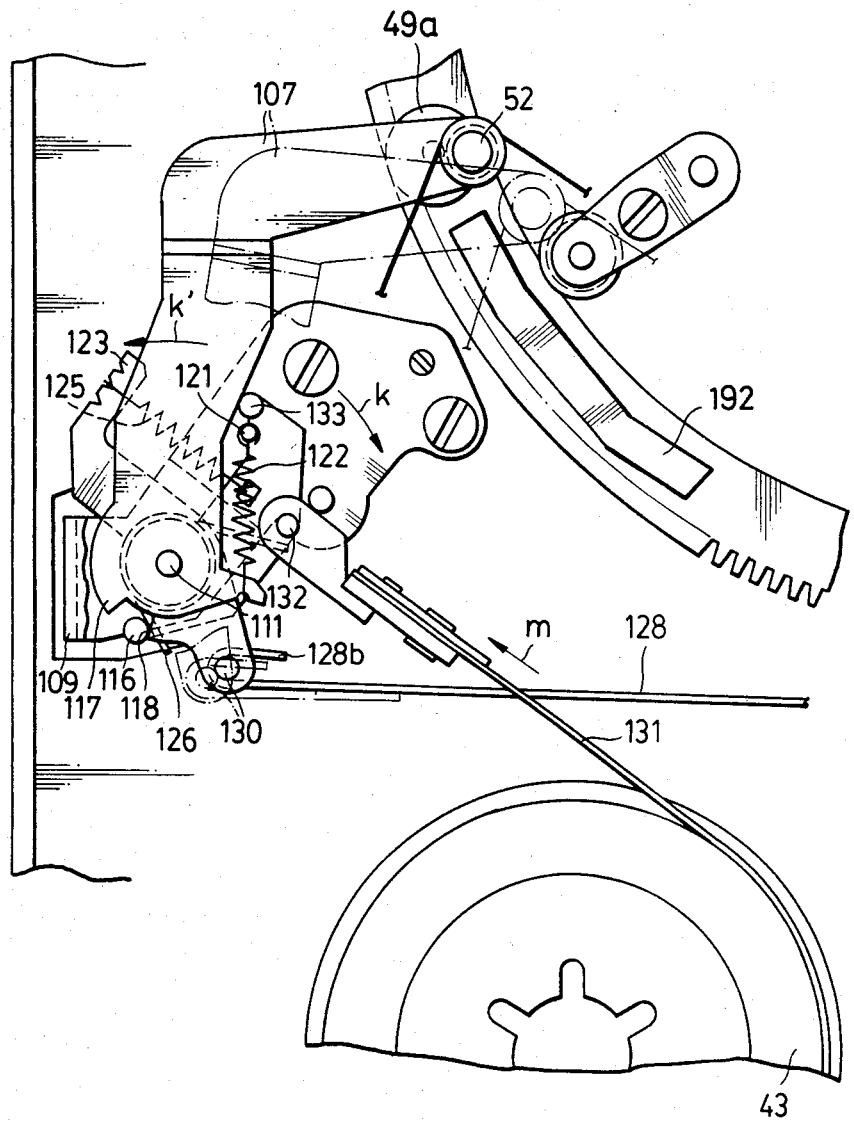
Figure 14:
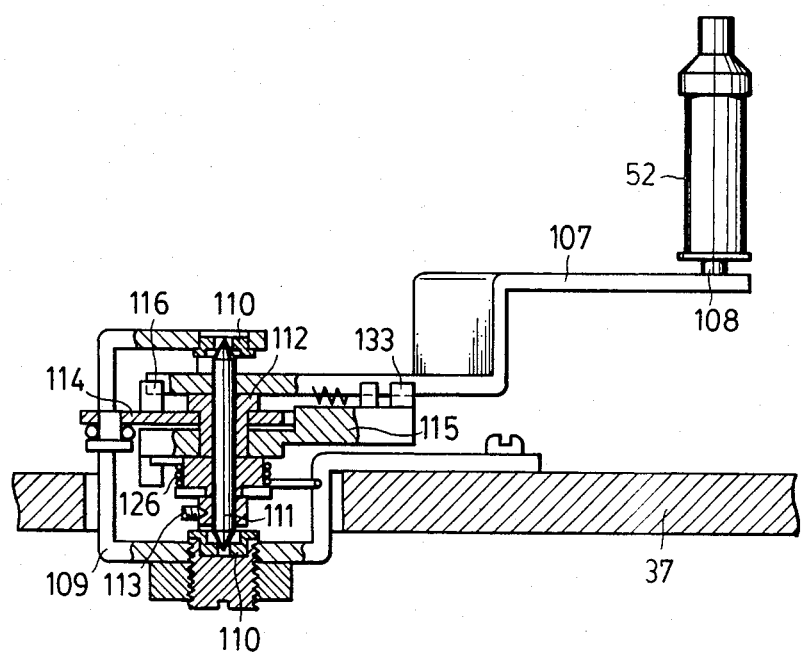
FIG. 14 is a side elevational view, partly broken away and in section, of the tension regulator mechanism of FIGS. 13A and 13B.
Figure 15:
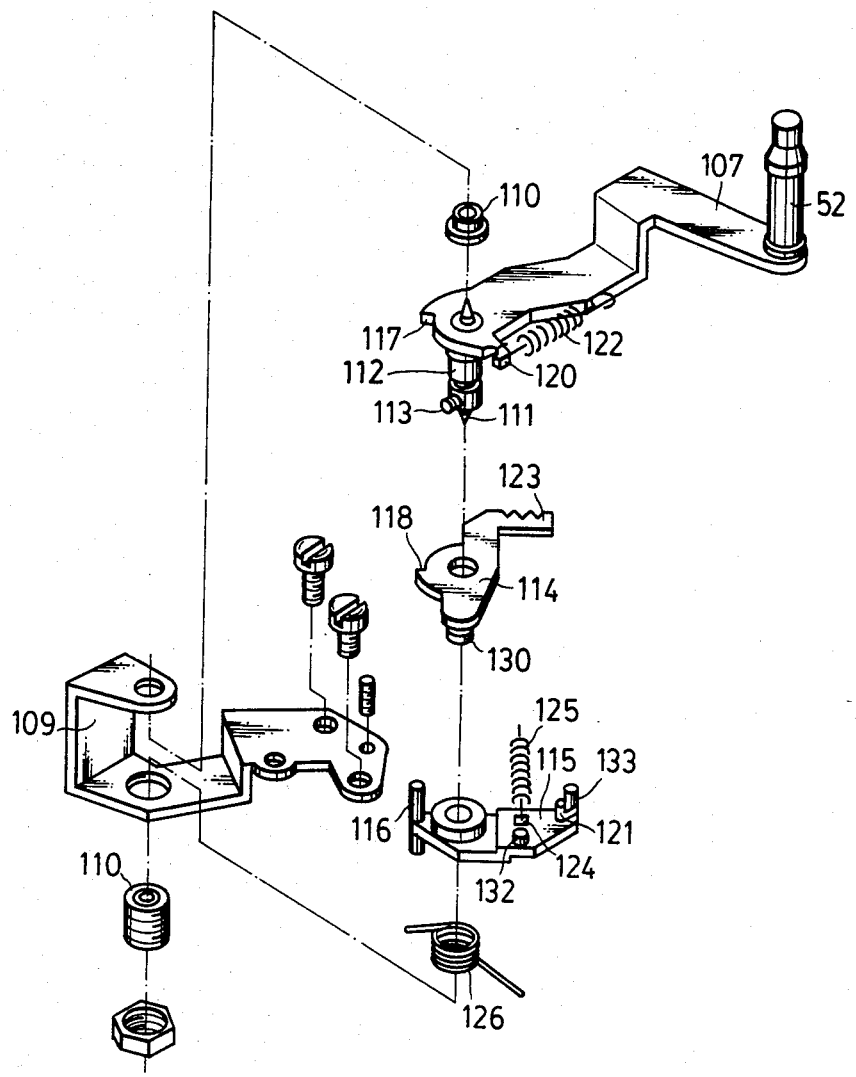
FIG. 15 is an exploded perspective view of elements included in the tension regulator mechanism of FIGS. 13A and 13B.

Referring now to FIGS. 13A–15, it will be seen that tension regulator mechanism 62 comprises a tension regulator arm 107 having an upstanding shaft 108 (FIG. 14) fixed to its free end for rotatably supporting tension regulator element 52 which is in the form of a roller. A tension regulator mounting plate 109 of generally C-shaped configuration (FIG. 14) is secured, at its lower portion, on chassis 37 at the left-hand side of support ring 32. A shaft 111 is formed with conical tips at its opposite ends which are rotatably received in pivot bearings 110 carried by the upper and lower portions of mounting plate 109. The end of tension regulator arm 107 remote from shaft 108 is joined to a support sleeve 112 which extends over shaft 111 and is secured to the latter by a set screw 113 (FIGS. 14 and 15). A tension regulator drive lever 114 is disposed above a brake drive lever 115, and both levers 114 and 115 are mounted on sleeve 112 below tension regulator arm 107 so as to be angularly displaceable relative to each other and relative to arm 107. A pin 116 is formed integrally with brake drive lever 115 and extends parallel to the axis of shaft 111 above and below lever 115. The upper end portion of pin 116 extends beyond tension regulator drive lever 114 and is engageable by a radial face of a nose 117 formed on tension regulator arm 107 (FIG. 15). A nose 118 is formed on tension regulator drive lever 114 and has a radial face directed oppositely to the radial face of nose 117 so that noses 117 and 118 are engageable with pin 116 at opposie sides of the latter, as shown on FIG. 13A.

Spring anchors or hooks 120 and 121 are formed on arm 107 and brake drive lever 115, respectively, and a tension regulator return spring 122 is connected, at its opposite ends, to anchors 120 and 121 for urging arm 107 to turn relative to lever 115 in the direction maintaining nose 117 against pin 116. An arm 123 formed with spaced apart notches extends integrally from tension regulator drive lever 114 to form a spring anchor, and brake drive lever 115 is formed with a hole or cut-out 154 forming another spring anchor, so that a tension regulator spring 125 having a biasing force stronger than that of spring 122, can be connected, at its opposite ends, to anchors 123 and 124 for urging levers 114 and 115 to turn relative to each other in the direction urging nose 118 against pin 116. By reason of springs 122 and 125 urging noses 117 and 118 against pin 116 from the opposite sides of the latter, arm 107 and levers 114 and 115 tend to turn, as a unitary assembly, about shaft 111. Further, such unitary assembly is urged to turn in the direction indicated by arrow k on FIG. 13A by means of a torsion spring 126 which extends around a lower portion of sleeve 112 and has its opposite ends engaged against pin 116 and mounting plate 109, respectively.

In order to operate tension regulator mechanism 62 in synchronism with drive mechanism 61, a connecting rod 128 (shown in broken lines on FIG. 5) extends laterally across chassis 37 and, at its opposite ends, is formed with hook-shaped portions 128a (FIG. 6A) and 128b (FIG. 13A) which engage, with some play, pins 129 and 130, respectively, depending from interlocking lever 98 and tension regulator drive lever 114, respectively. A brake band 131 is wound or wrapped about approximately a 180° angular extent of the outer circumference of supply reel shaft 43 (FIGS. 13A and 13B), with one end of brake band 131 being anchored to chassis 37 by suitable means (not shown), while the other end of brake band 131 is connected with brake drive lever 115 by a pin 132 formed integral with the latter.

The above described tension regulator mechanism 62 operates as follows:

In the fully unloaded condition of tape loading device 31, draw-out guide 51 and lever 88 supporting the same are in their inactive positions shown on FIG. 6A, as earlier described, and spring 126 is operative to urge arm 107 and levers 114 and 115, as a unit, in the direction of the arrow k on FIG. 13A to the positions there shown with tension regulator element 52 being thereby disposed in back of tape 34 in the run thereof extending across opening 40 at the front of the mounted cassette 33, as shown on FIG. 1. In response to such urging of tension regulator element 52 to its inactive position by spring 126, connecting rod 128 is pulled toward the left, as viewed on FIGS. 6, 6A and 13A, with the result that interlocking lever 98 is urged in the direction of the arrow i on FIG. 6A for engagement with vertical connection portion 88c of lever 88, as earlier noted.

When lever 88 is turned in the direction of arrow g' on FIG. 6A by the action of cam 83 on cam follower pin 96 in the course of a tape loading operation, interlocking lever 98 is turned in the direction of the arrow i' on FIG. 6A, for example, to the position indicated in dot-dash lines on FIG. 6B, by the action of connection portion 88c of lever 88 on interlocking lever 98. As a result of such turning of interlocking lever 98, connecting rod 128 is pulled in the direction of the arrow 1 on FIGS. 6B and 13A, and such pull causes tension regulator drive lever 114, brake drive lever 115 and tension regulator arm 107 to be turned, as a unit, in the direction of the arrow k' on FIG. 13A against the force of spring 126. Therefore, in response to the turning of interlocking lever 98 to the position shown in dot-dash lines on FIG. 6B during the initial portion of a tape loading operation, tension regulator arm 107 and tension regulator element 52 are moved to the operating positions shown in dot-dash lines on FIG. 13B. Thereafter, when interlocking lever 98 is further turned to the position shown in full lines on FIG. 6B by the engagement of projection 101 on cam gear 84 with pin 100 immediately before the completion of a tape loading operation, tension regulator arm 107 and tension regulator element 52 thereon are further urged to their final positions shown in full lines on FIG. 13B.

It will be apparent that, in effecting the above movements of tension regulator arm 107 and element 52 in response to the turning of interlocking lever 98, it is tension regulator drive lever 114 which is positively driven in the direction of the arrow k' by the movement of connecting rod 128 in the direction of the arrow l. The turning of lever 114 in the direction of arrow k' is transmitted to brake drive lever 115 through spring 125, and arm 107 is, in turn, urged to follow the turning of lever 115 by means of spring 122. Further, a pin 133 is formed integrally with brake drive lever 115 at the end of the latter remote from pin 160 and extends upwardly from lever 115 so as to be engagable with arm 107. Thus, pin 133 limits the turning of arm 107 relative to lever 115 in the direction of the arrow k on FIGS. 13A and 13B. Accordingly, spring 122, which as earlier noted exerts a relatively light spring force, tends to maintain arm 107 in an angular position relative to lever 115 in which nose 117 engages pin 116. However, if the resistance to movement of arm 107 from the position of FIG. 13A to either of the positions shown on FIG. 13B exceeds the force exerted by spring 122, for example, by reason of tension in the tape engaged by element 52, then lever 115 is displaced in the direction of the arrow k' relative to arm 107 until pin 133 engages arm 107 to continue the movement of arm 107 and regulator element 52 to their forward operative positions.

The turning of brake drive lever 115 with lever 114 in the direction of the arrow k' in the course of a tape loading operation of device 31 is effective to exert a pull on brake band 131 in the direction of the arrow m on FIG. 13B so that brake band 131 is pressed against the circumferential surface of supply reel shaft 43 with a force determined by the strength of spring 125.

During a recording or reproducing operation of the VTR, the tension in tape 34 engaging tension regulator element or roller 52 urges arm 107 to turn in the direction of the arrow k on FIG. 13B against the force of spring 122 and into engagement with pin 133. If the tension in tape 34 exceeds a predetermined value established by spring 125 and being adjustable by displacement of spring 125 from one to another of the notches in its anchoring arm 123 on lever 114, arm 107, and with it lever 115, are turned in the direction of arrow k against the force of spring 125, for example, to the position shown in dot-dash lines on FIG. 13B. Such angular movement of lever 115 in the direction of the arrow k eases the pull on brake band 131 and thereby reduces the resistance to unwinding of the tape from the supply reel for reducing the tape tension. Thus, in response to changes in the tape tension during recording or reproducing operations of the VTR, tension regulator element 52 and arm 107 are moved in the direction of the arrow k or the arrow k' on FIG. 13B for suitably varying the braking force acting on supply reel shaft 43 and thereby maintaining a predetermined tension on the tape 34.

When a tape unloading operation of device 31 is effected and, in the course thereof, swinging support lever 88 and interlocking lever 98 are restored to their respective positions shown on FIG. 6A, as described previously, the resulting movement of connecting rod 128 toward the left, as viewed on FIG. 5, is effective to restore tension regulator element 52 and arm 107 to their inactive positions shown in FIG. 13A.

Figure 16A:
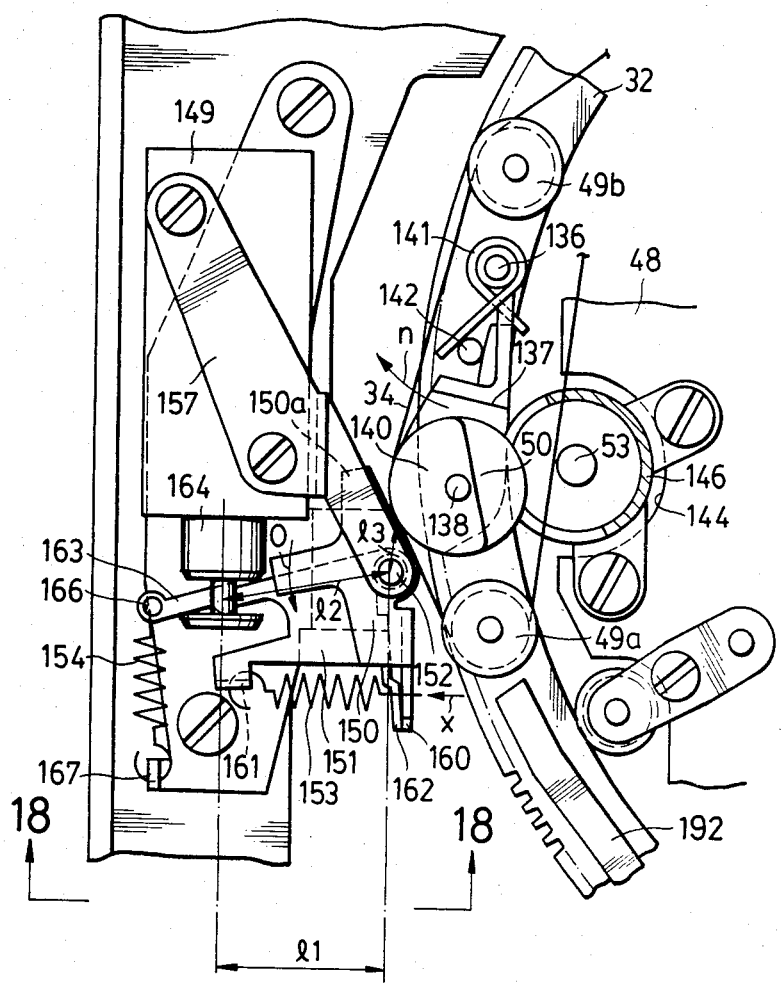
FIGS. 16A and 16B are enlarged fragmentary plan views of a pinch roller press mechanism included in the cassette-type helical scan VTR of FIG. 5, and which is shown in respective different conditions thereof.
Figure 16B:
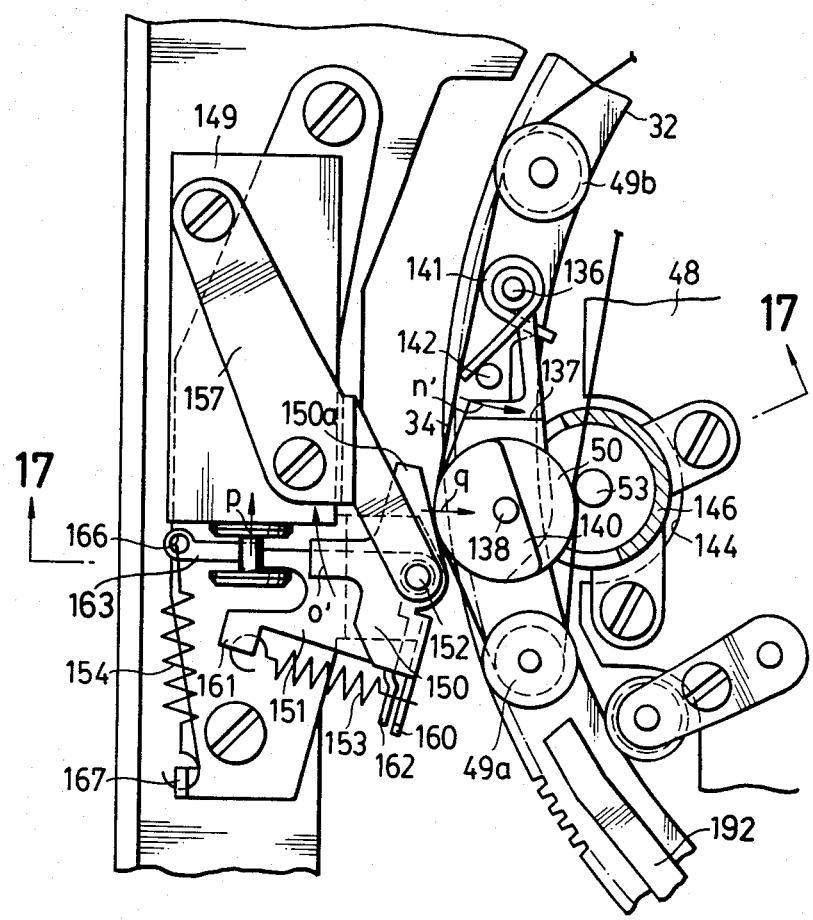
Figure 17:
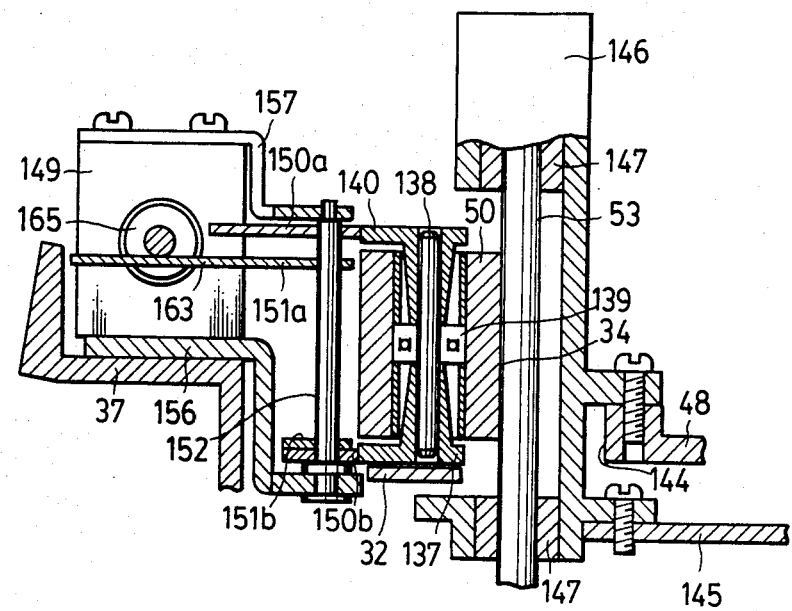
FIG. 17 is a sectional view of the pinch roller press mechanism, as viewed along the line 17—17 on FIG. 16B.
Figure 18:
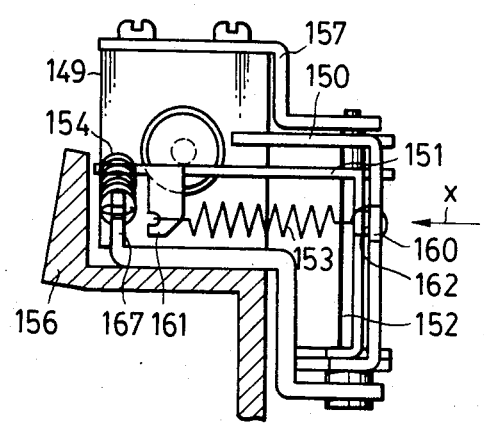
FIG. 18 is a detailed elevational view of the pinch roller press mechanism, as viewed in the direction of the arrows 18—18 on FIG. 16A.

Referring now to FIGS. 16A, 16B and 17, it will be seen that a pinch roller support lever 137 is swingably supported adjacent one end on a shaft 136 which projects upwardly from support ring 32 perpendicular to the latter. A shaft 138 also extending perpendicular to the plane of support ring 32 is fixed, at its lower end portion, in lever 137 adjacent the end of the latter remote from shaft 136. Pinch roller 50 is rotatably supported on shaft 138 by means of a bearing 139 (FIG. 17) which extends around an intermediate or central portion of shaft 138. A bearing plate or shoe 140 of substantially semi-circular shape is secured on the upper end portion of support shaft 138 so that bearing shoe 140, and a corresponding portion of support lever 137 provide surfaces at which forces can be exerted for urging pinch roller 50 therebetween against capstan 53, as hereinafter described in detail. A torsion spring 141 extends around shaft 136 and bears, at its opposite ends, against pinch roller support lever 137 and a pin 142 on support ring 32 for urging lever 137 to swing in the direction of the arrow n to the position shown on FIG. 16A, and in which lever 137 bears against pin 142.

Capstan 53 is shown to extend upwardly within a recess 144 formed in inclined base 48. Capstan 53 is rotatably supported in a pair of vertically spaced apart oil-less metal bearings 147 which are mounted within a bearing block 146 secured both to inclined base 48 and to an auxiliary base plate 145 positioned therebelow (FIG. 17). At the completion of a tape loading operation of device 31, support lever 137 with pinch roller 50 thereon is at the lowermost position of inclined support ring 32, that is, at the left-hand side of ring 32 on FIG. 1, and closely adjacent the position of capstan 53 so that the overall height of tape loading device 31 and of the VTR incorporating the same may be reduced.

Figure 19:
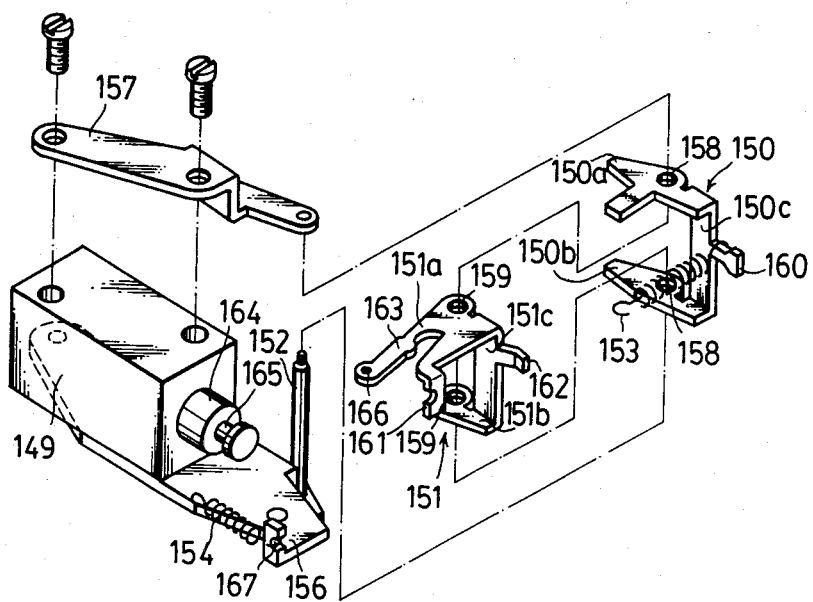
FIG. 19 is an exploded perspective view of elements included in the pinch roller press mechanism of FIGS. 16A and 16B.

As shown on FIG. 19, pinch roller press mechanism 63 generally comprises a solenoid 149, a pinch roller pressing member 150, an intermediate member 151, a shaft 152 on which pressing member 150 and intermediate member 151 are both pivotally mounted, a spring 153 connecting members 150 and 151, as hereinafter described in detail, for determining the force with which mechanism 63 is effective to press pinch roller 50 against capstan 53, and a return spring 154 by which mechanism 63 is restored to its inactive condition.

As shown particularly on FIGS. 16A and 17, solenoid 149 is mounted through a bracket 156 on chassis 37 near the position of pinch roller 50 at the completion of a tape loading operation. Shaft 152 extends upwardly from mounting bracket 156 and is further secured in position by a support or mounting plate 157 fixed on top of solenoid 149.

Pinch roller pressing member 150 is constituted by upper and lower levers 150a and 150b and a connecting portion 150c extending between one end portions of levers 150a and 105b. Levers 150a and 150b are formed with centrally located holes 158 receiving shaft 152 for pivotally mounting pressing member 150 on the latter. Intermediate member 151 is constituted by upper and lower arms 151a and 151b with a connecting portion 151c extending between ends thereof, and arms 151a and 151b are formed with holes 159 adjacent the ends thereof remote from connecting portion 151a for also receiving shaft 152 when intermediate member 152 is mounted on shaft 152 between the upper and lower levers 150a and 150b of pressing member 150. Mounting bracket 156 is disposed so that, at the completion of a tape loading operation of device 31, edges of the upper and lower levers 150a and 150b, at the end portions thereof remote from connecting portion 150c, will be disposed in opposing relation to the edge surface of shoe 140 and the corresponding edge surface of pinch roller support lever 137, respectively, as shown on FIG. 17. Spring 153 is shown to be connected, at its opposite ends, to a projection or spring anchor 160 extending from the connecting portion 150c of pressing member 150, and to a spring anchor 161 which extends integrally from the upper arm 151a of intermediate member 151. Further, the connecting portion 151c of intermediate member 151 has an abutment 162 projecting therefrom for engagement against the projection 160 of pressing member 150 under the urging of spring 153. As further shown, an extension 163 projects from upper arm 151a of intermediate member 151 and engages in an annular groove 165 formed in the free end portion of an armature 164 of solenoid 149. Solenoid 149 is of the type which retracts its armature 164 upon the electrical energizing of the solenoid, and return spring 154 is connected between a spring anchor 166 formed at the free end of extension 163 and an anchor 167 provided on mounting bracket 156 for rocking intermediate member 151 in the direction which extends armature 164 from solenoid 149 upon deenergizing of the latter.

Pinch roller press mechanism 63 operates as follows: Solenoid 149 is deenergized, return spring 154 urges intermediate member 151 to pivot about shaft 152 in the direction of the arrow o on FIG. 16A, so that extension 163 causes armature 164 to move axially to its extended position. Further, spring 153 urges press member 150 relative to intermediate member 151 for energizing abutment 162 against projection 160, and thereby establishing the inactive position of pressing member 150. With pressing member 150 in such inactive position, upon the completion of a tape loading operation of device 31, pinch roller 50 comes to rest alongside pressing member 150, as shown on FIG. 16A. Thereafter, actuation of the recording or reproducing push-button of the VTR for initiating a recording or reproducing operation causes energizing of solenoid 149, whereby armature 164 is retracted or displaced in the direction of the arrow p on FIG. 16B. As a result of such retraction of armature 164 and the engagement of extension 163 in groove 165, intermediate member 151 is turned in the direction of the arrow o' on FIG. 16B against the force of return spring 154. Further, the turning of intermediate member 151 in the direction of the arrow o' is transmitted to pressing member 150 through spring 153 with the result that side edge surfaces of levers 150a and 150b of member 150 are made to bear, in the direction of the arrow q on FIG. 16B, against the opposing surfaces of shoe 140 and pinch roller support lever 137, respectively. Thus, pinch roller support lever 137 is angularly displaced in the direction of the arrow n on FIG. 16B against the force of spring 141 so as to press pinch roller 50 against capstan 53 with the tape 34 therebetween.

As is shown on FIG. 16B, the angular displacement of intermediate member 151 resulting from retraction of armature 164 upon energizing of solenoid 149 is larger than the angular displacement of press member 150 required to urge pinch roller 50 against capstan 53. Thus, in the energized condition of solenoid 149, abutment 162 on intermediate member 151 is moved away from projection 160 on pressing member 150, thereby ensuring that spring 153 connected between members 150 and 151 will reliably determine the force with which mechanism 63 is operative to urge pinch roller 50 against capstan 53.

When solenoid 149 is again deenergized, for example, at the conclusion of a recording or reproducing operation, return spring 154 restores armature or plunger 164 to its extended position and returns intermediate member 151 and pressing member 150 to their inactive positions shown on FIG. 16A. Upon the return of pressing member 150 to its inactive position, spring 141 can angularly displace pinch roller support lever 137 in the direction of the arrow n on FIG. 16A for again separating pinch roller 50 from capstan 53.

It will be appreciated that, in the inoperative condition of pinch roller press mechanism 63, spring 153 acts strongly to urge pressing member 150 to the position relative to intermediate member 151 in which abutment 162 engages projection 160. In the illustrated pinch roller press mechanism 63, the location at which abutment 162 engages with projection 160 is shown to coincide with the line of force of spring 163 indicated by the arrow x on FIG. 16A. Thus, the spring force and any torque therefrom are cancelled by the reaction to the spring force at the point of contact of abutment 162 with projection 160.

Figure 20:
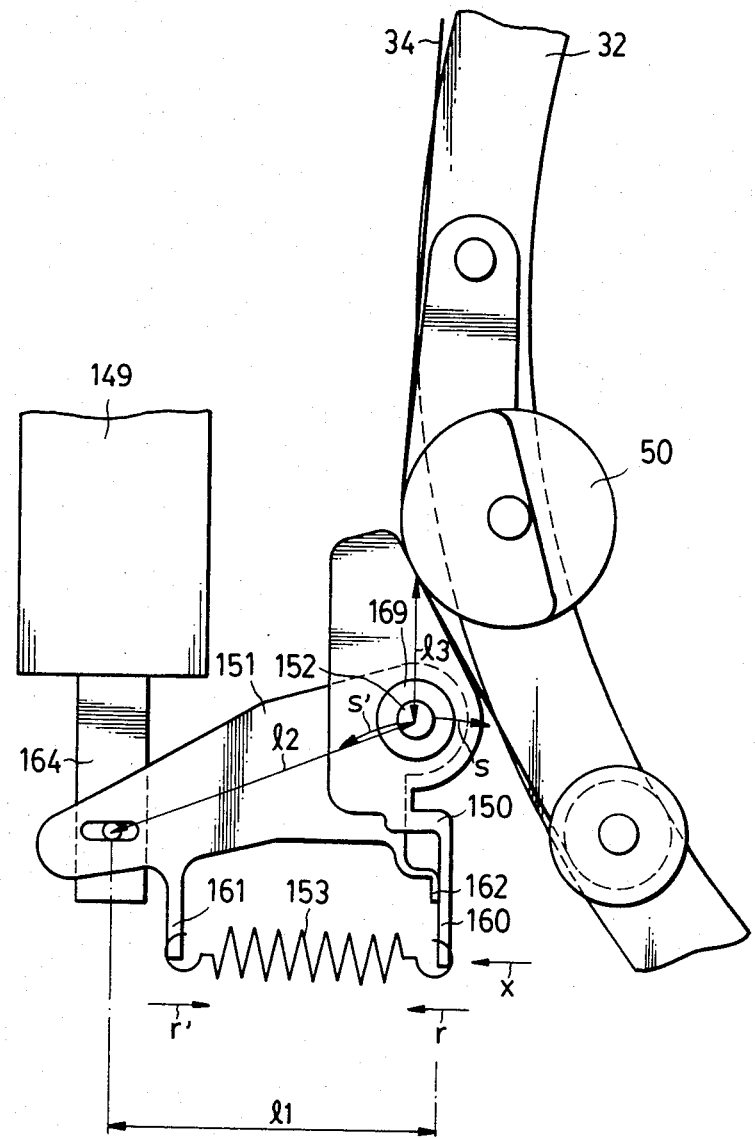
FIG. 20 is a schematic plan view to which reference will be made in explaining advantages of the pinch roller press mechanism of FIGS. 16A, 16B, 17, 18 and 19.

In contrast to the foregoing, and as shown schematically on FIG. 20, if the abutment 162 on intermediate member 151 engaged projection 160 at a distance from shaft 152 that differs from the distance of the line of force x of spring 153 from shaft 152, the force of spring 153 tends to rotate members 150 and 151 relative to each other about a fulcrum corresponding to the point of engagement of abutment 162 with projection 160. More particularly, the forces of spring 153 on members 150 and 151, represented by the arrow r and r' on FIG. 20 tend to turn members 150 and 151 in the direction indicated by the arrows s and s', respectively, about the fulcrum defined by the engagement of abutment 162 with projection 160. Thus, members 150 and 151 strongly pull shaft 152 in opposed directions, as indicated by the arrows s and s', and, as a result thereof, pinch roller pressing member 150 and intermediate member 151 exert strong frictional forces on shaft 152. Such strong frictional forces would make it necessary to provide a solenoid 149 of large size or capacity which, of course, is undesirable. If the need for a large solenoid is avoided by providing a sleeve or bushing 169 around shaft 152 and then mounting pressing member 150 and intermediate member 151 on shaft 152 by way of the bushing 169, so that the frictional resistance to turning of members 150 and 151 relative to shaft 152 may be reduced, the effect thereof is to require an increase in the distance between the axis of shaft 152 and the axis of pinch roller 50 at least by the radial thickness of bushing 169.

However, with the pinch roller press mechanism 63 embodying the present invention, and as described above with reference to FIGS. 16A–19, the arrangement of the point of contact of abutment 162 with projection 160 to coincide with the line of force x of spring 153 ensures that, in the inoperative condition of mechanism 63, spring 153 does not give rise to any twisting forces or torque that may act on shaft 152. Thus, pressing member 150 and intermediate member 151 are smoothly rotatably about shaft 152 without the provision of the sleeve or bushing 169 thereon, and the effective diameter of shaft 152 can be made very small to permit such shaft to be arranged relatively close to the center of pinch roller 50, as shown on FIG. 16A. By reason of the relatively small distance distance between the center of shaft 152 and the center of pinch roller 50 made possible with the press mechanism 63 according to this invention, it is further possible to reduce the distance $l_1$ that solenoid 149 is located outwardly in respect to pinch roller 50 and still obtain a sufficiently large value for the ratio $l_2/l_3$, in which $l_2$ is the distance from the axis of shaft 152 to the point of contact of extension 163 with armature 164, and $l_3$ is the distance from the axis of shaft 152 to the points where the edge surfaces of levers 150a and 150b of pressing member 150 act against opposing edge surfaces of shoe 140 and pinch roller support lever 137. Since the present invention permits the ratio $l_2/l_3$ to be made relatively large while minimizing the distance $l_1$, it becomes possible to use a solenoid 149 of relatively small capacity for achieving a sufficient pressure of pinch roller 50 against capstan 53. Thus, the overall width of the tape loading apparatus 31 can be reduced for permitting the VTR to be made relatively compact. Since the shaft 152 of small diameter is supported at its opposite ends in bracket 156 and mounting plate 157, the pivotal mounting of members 150 and 151 is very stable, with the result that the pressing of pinch roller 50 against capstan 53 is reliably and uniformly effected.

Figure 21:
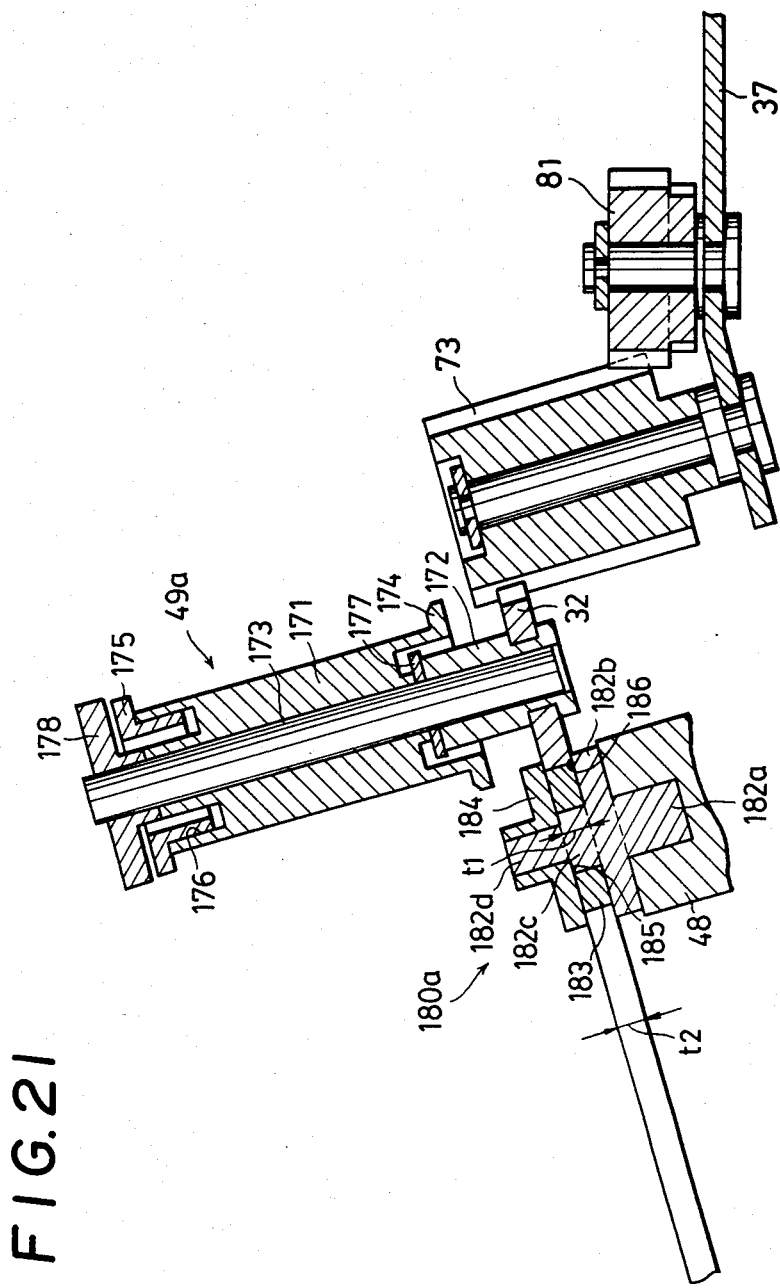
FIG. 21 is an enlarged sectional view showing details of tape guide rollers and of the mounting of a support ring therefor in the tape loading device according to this invention.

Referring now to FIG. 21, it will be seen that each of guide rollers 49a–49d preferably includes a cylindrical roller body 171 rotatable on a shaft 173 which is fixed, at its lower end portion, in a mounting boss 172 secured to support ring 32. The cylindrical roller body 171 is shown to be formed with an integral flange 174 at its lower end, and an upper flange member 175 is formed integrally with a collar which is pressed into an axially opening recess 176 at the upper end portion of roller body 171. A washer 177 is interposed axially between the rotary roller body 171 and mounting boss 172, and a stopper 178 is suitably fixed on the upper end portion of shaft 173 for retaining roller body 171 thereon.

As shown particularly on FIG. 5, support ring 32 of tape loading device 31 is rotatably supported by means of three ring guides 180a, 180b and 180c mounted on inclined base 48 at substantially equally spaced apart locations along a circle for engaging and supporting ring 32 at the inner periphery of the latter. Two of the guides supporting ring 32, that is, the guides 180a and 180b, may be directly mounted on inclined base 48, while the third guide 180c is mounted on base 48 by way of an adjustable mounting plate 181 which suitably permits adjustment of the position of the respective guide 180c in the radial direction of ring 32. Thus, ring 32 can be mounted for smooth rotation with substantially no play between ring 32 and guides 180a–180c.

As shown on FIG. 21 in respect to guide 180a, each of guides 180a–180c preferably includes a metal core machined with high precision on a lathe and including, considered upwardly from the lower end, an end portion or stud 182a adapted to be pressed into base 48 in the case of guides 180b and 180c, or into mounting plate 181 in the case of guide 180a, a flange 182b directed radially outward above stud 182a, a reduced diameter roller holder portion 182c above flange 182b, and a still further reduced diameter upper end portion 182d. The axial thickness or dimension $t_1$ of roller holder portion 182c of the metal core is made greater, by several microns, than the thickness $t_2$ of support ring 32 which is preferably formed of sheet metal. A plastic roller or ring 183 of the same thickness $t_2$ as support ring 32 is rotatable around roller holder 182c and has a smaller outer diameter than that of flange 182b. A stop member 184 in the form of a disc with a central bore and an outer diameter similar to that of flange 182b is pressed onto the upper end portion 182d of the core so as to bear against an annular shoulder or step 185 which is defined between roller holder 182c and upper end portion 182d. It will be apparent that an annular gap 186 defined between flange 182b and stop member 184 is greater, by several microns, than the thickness of plastic roller 183 which is equal to the thickness $t_2$ of support ring 32. The inner periphery of ring 32 is inserted in such gap 186 so as to be guided by the rotatable plastic roller 183.

It will be appreciated that the above described structure of ring guides 180a–180c ensures that support ring 32 can be very smoothly rotated about its center without any substantial play in the vertical directions. This is to be distinguished from the conventional arrangement in which a support ring similar to ring 32 is supported for rotation by means of molded plastic rollers having upper and lower flanges as integral parts thereof, with the inner periphery of support ring being guided between such flanges on the rollers. However, when guide rollers of plastic material having upper and lower flanges as integral molded parts thereof are employed, a relatively large molding error is unavoidable and the gap between the flanges cannot be made substantially equal to the thickness of the supported ring. By reason of the foregoing, the mounted support ring of the conventional tape loading device is subject to substantial play in the vertical direction with the result that the travel of the magnetic tape is adversely affected. However, when the guides 180a, 180b and 180c have the construction described above with reference to FIG. 21, vertical play of the rotatably mounted support ring 32 is substantially eliminated and the smooth rotation of ring 32 is achieved.

Further, as shown on FIGS. 5, 13B, 16A and 16B, tape loading device 31 according to this invention is preferably provided with a tape reception guide 192 of plastic material fixed on the upper surface of support ring 32 in advance of guide roller 49a. Such tape reception guide 192 is provided to receive and smoothly support tape 34 if the latter is slackened and slips off guide roller 49a. By reason of tape reception guide 192, contact of tape 34 with ring gear 82, and consequent damage to the tape, is prevented even when the tape becomes slack.

Furthermore, as shown on FIG. 5, a pinch roller guide 193 is preferably mounted along the outer circumference of support ring 32 and extends substantially from the center of chassis 37 at the front of ring 32 to adjacent the location of interlocking lever 98 so as to be in front of the tape cassette 33 mounted on chassis 37. Such pinch roller guide 193 is disposed so that, when pinch roller 50 passes through front opening 40 of a cassette 33 during a tape loading or unloading operation of device 31, pinch roller support lever 137 (FIGS. 16A and 16B) engages pinch roller guide 193 and is pressed inwardly thereby, that is, in the direction of the arrow n' on FIG. 16B against the force of spring 141 for ensuring that pinch roller 50 will not strike the edge 194 at the front opening of cassette 33. By reason of pinch roller guide 193, the mounted tape cassette 33 can be disposed very close to support ring 32 of tape loading device 31.

Although the tape loading device 31 embodying this invention has been described as being incorporated in a video tape recorder or VTR, it is to be understood that the invention may be similarly advantageously applied to other apparatus, and particularly to apparatus in which an information signal, such as, a digital or other audio signal, is recorded and/or reproduced on a magnetic tape.

By way of summary, it is to be noted that, in accordance with an important feature of the invention as embodied in the above-described tape loading device 31, draw-out guide pin 51 is mounted so as to be substantially vertically disposed during movement between its inactive position and its operative or forwardly displaced position in a predetermined timed relation to turning of support ring 32. Thus, draw-out guide pin 51 extends substantially at right angles to the longitudinal median of the tape 34 during the movement of pin 51 which contributes to the withdrawal of the tape from cassette 33 so that the tape may be thereby smoothly drawn out without damage to the tape by pin 51. Further, upon attaining its operative or forwardly displaced position, draw-out guide pin 51 is inclined by its engagement with guide positioning plate 103 so as to provide the necessary turning of tape 34 from the portion of its path defined by guide rollers 49a–49d extending perpendicular to the inclined plane of support ring 32, to the portion of the tape path extending from draw-out guide pin 51 back to the horizontally mounted cassette 33.

Although an illustrative embodiment of the invention has been described in detail herein with reference to the accompanying drawings, it is to be understood that the invention is not limited to that precise embodiment and that various changes and modifications may be effected therein by one skilled in the art without departing from the scope or spirit of the invention as defined in the appended claims.

What is claimed is:

1. In a magnetic recording and/or reproducing apparatus having a cylindrical tape guide drum with at least one rotary magnetic head adapted to move in a circular path substantially coinciding with the outer circumferential surface of said drum, and means for holding a wound supply of magnetic tape apart from said drum with the longitudinal median of the tape lying in a first plane; a tape loading device comprising:

a support member extending around said guide drum and being rotatable in a seocnd plane that is inclined with respect to said first plane;

freely rotatable first tape guide means mounted on said support member and having its axis extending perpendicularly in respect to said second plane in which the support member is rotatable and being responsive to rotation of said support member for withdrawing tape from said wound supply and wrapping a portion thereof about said outer circumferential surface of the tape guide drum, said first tape guiding means engaging said tape such that the longitudinal median of said portion of said tape is substantially parallel to said second plane when said portion of said tape is wrapped about said outer circumferential surface of the tape guide drum;

second tape guiding means movable, in predetermined time relation to said rotation of the support member, from a first position adjacent said wound supply of tape to a second position spaced from the latter and in which said second tape guiding means engages a run of the tape withdrawn from said wound supply between the latter and said first tape guiding means, said second tape guiding means being in an erect condition substantially perpendicular to said first plane when at said first position thereof and also during a major portion of its movement from said first position to said second position, said second tape guiding means in said second position thereof being displaceable to an inclined condition relative to perpendiculars to said first and second planes, respectively, such that said run of the tape engaged by said second guiding means is deflected by the latter from having its longitudinal median substanitally parallel to said second plane in said wrapped portion to have the longitudinal median of the tape near said wound supply substantially parallel to said first plane; and means acting on said second tape guiding means at said second position thereof for displacing said second tape guiding means to said inclined condition.

2. An apparatus according to claim 1; in which said support member includes a circular ring member rotatable about its center which is eccentrically located in respect to the axis of said cylindrical tape guide drum.

3. An apparatus according to claim 2; in which said first tape guiding means includes a plurality of elongated guide rollers rotatably mounted on said ring member at locations spaced apart along the latter and each having its longitudinal axis of rotation perpendicular to said second plane which contains said ring member.

4. An apparatus according to claim 1; in which said second tape guiding means includes a second support member movable in said predetermined timed relation to the rotation of the first mentioned support member, an elongated tape guiding element, means mounting said tape guiding element on said second support member for rocking relative to the latter between said erect and inclined conditions, and means urging said tape guiding element to said erect condition.

5. An apparatus according to claim 4; in which said means mounting the tape guiding element on said second support member has a rocking axis which substantially intersects the longitudinal median of the tape at the engagement of the latter with said tape guiding element.

6. An apparatus according to claim 5; in which said means mounting the tape guiding element for rocking relative to said second support member is secured to said tape guiding element at a lower end of the latter, and said means acting on the second tape guiding means at said second position engages the upper end portion of said elongated tape guiding element for rocking the latter about said rocking axis and stably disposing said tape guiding element in said inclined condition.

7. An apparatus according to claim 4; in which the first mentioned support member includes a circular ring member and means mounting said ring member for rotation about its center between a first position corresponding to a completely unloaded condition of said tape loading device and a second position corresponding to a fully loaded condition of said device; and further comprising drive means for said ring member and said second support member for moving the latter from said first position to said second position of said second tape guiding means during an initial portion of the rotation of said ring member from said first position to said second position of said ring member.

8. An apparatus according to claim 7; in which said drive means includes a motor, gear means for rotatably driving said ring member from said motor,cam means also rotatably driven by said gear means, and a cam follower on said second support member engaging said cam means for moving said second support member in response to rotation of said cam means.

9. An apparatus according to claim 8; in which said cam means has a configuration to move said second support member from said first position to said second position thereof upon turning of said cam means through only a portion of a revolution and to maintain said second support member in said second position thereof for the remainder of said revolution.

10. An apparatus according to claim 7; in which said means mounting the ring member for rotation includes at least three spaced apart rotary guides equidistant from said center of the ring member and each including a stationary metal core having a reduced diameter portion between two spaced apart flanges and a plastic ring rotatable on said reduced diameter portion and having an outer diameter smaller than that of each of said flanges, said plastic ring having a thickness equal to that of said ring member and the distance between said flanges being slightly larger than said thickness so that a peripheral edge portion of said ring member can fit between said flanges to ride on said plastic ring.

11. An apparatus according to claim 7; in which said first tape guiding means including a plurality of elongated guide rollers rotatably mounted on said ring member at locations spaced apart along the latter and each having its longitudinal axis of rotation perpendicular to said second plane in which said ring member is rotatable.

12. An apparatus according to claim 1; in which said support member includes a circular ring member rotatable about its center, and said second tape guiding means is located at one side of said ring member; and further comprising tension regulator means located adjacent the opposite side of said ring member and including a tension regulating element movable from an inactive position adjacent said wound supply of tape to an operative position spaced apart from said wound supply and at which said tension regulating element engages a run of the tape withdrawn from the wound supply for maintaining a predetermined value of tension therein, and interlock means for moving said tension regulating element from said inactive position to said operative position in synchronism with movement of said second tape guiding means from said first position to said second position.

13. An apparatus according to claim 12; in which said second tape guiding means includes a second support member having a tape guide element thereon and being movable in said predetermined timed relation to the rotation of said ring member for movement of said tape guide element from said first position to said second position, and said interlock means is actuable by said second support member in moving to said second position thereof for moving said tension regulating element at least a major portion of the distance from said inactive position to said operative position.

14. An apparatus according to claim 13; further comprising drive means for said ring member and said second support member for moving the latter from said first position to said second position during an initial portion of the rotation of said ring member required to complete said wrapping of a portion of the withdrawn tape about the drum, and means included in said drive means and acting on said interlock means during the completion of said wrapping for moving said tension regulating element the remainder of said distance to said operative position.

15. An apparatus according to claim 13; in which said wound supply of tape is constituted by a cassette having supply and take-up reels therein, and said means for holding the wound supply includes supply and take-up reel shafts engaged by said supply and take-up reels of the cassette; and in which said interlock means includes yieldable transmission means so that said tension regulating element in said operative position can deflect in response to increased tension in said run of the tape engaged thereby; and said tension regulator means further includes brake means applied to said supply reel shaft for resisting turning of the latter in response to movement of said tension regulating element to said operative positions, and means for reducing the resistance to turning of said supply reel shaft in response to deflection of said tension regulating element by said increased tension in the tape run engaged thereby.

16. An apparatus according to claim 1; in which said support member includes a circular ring member rotatable about its center, and said second tape guiding means is located adjacent one side of said ring member; and further comprising a rotary capstan located adjacent said ring member at the opposite side thereof, a pinch roller, means mounting said pinch roller on said ring member so as to be adjacent said capstan with the tape therebetween when said first tape guiding means completes said wrapping of the tape about the tape guide drum and being movable relative to said ring member toward and away from said capstan, and pinch roller pressing means operative to press said pinch roller against said capstan.

17. An apparatus according to claim 16; in which said pinch roller pressing means includes a shaft fixedly mounted adjacent said opposite side of the ring member, a pressing member pivoted on said shaft and being engagable with the mounting means for the pinch roller so as to press the latter against said capstan, an intermediate member also pivoted on said shaft, spring means connecting said pressing and intermediate members, and electromagnetic means connected with said intermediate member and being operative, when energized, to pivot said intermediate member and, through said spring means, said pressing member in the direction to engage the latter against said mounting means for the pinch roller.

18. An apparatus according to claim 17; in which said spring means acts on said pressing and intermediate members on a line of force spaced from said shaft, and said pressing and intermediate members have interengagable portions aligned with said line of force for limiting relative pivoting of said pressing and intermediate members by said spring means.

19. An apparatus according to claim 18; in which said shaft is securely supported at its upper and lower ends, said pressing member has upper and lower active portions, and said mounting means for the pinch roller includes a pinch roller support lever pivoted at one end on said ring member and carrying an upstanding shaft adjacent the opposite end of said support lever and on which said pinch roller is rotatable, and a shoe secured on the upper end portion of said shaft on which the pinch roller is rotatable, said shoe and an edge of said pinch roller support lever being engagable by said upper and lower active portions, respectively, of the pressing member when said electromagnetic means are energized.

* * * * *